(12) United States Patent  (10) Patent No.: US 8,809,789 B2
Matsumoto et al.  (45) Date of Patent: Aug. 19, 2014

(54) INFRARED SENSOR AND AIR CONDITIONER

(75) Inventors: Takashi Matsumoto, Tokyo (JP); Toshiaki Yoshikawa, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 560 days.

(21) Appl. No.: 13/092,456

(22) Filed: Apr. 22, 2011

(65) Prior Publication Data

US 2012/0018639 A1 Jan. 26, 2012

(30) Foreign Application Priority Data

Jul. 26, 2010 (JP) ................ 2010-167071

(51) Int. Cl.
*G01J 5/02* (2006.01)
*G01J 5/10* (2006.01)
*F24F 11/00* (2006.01)
*G01J 5/08* (2006.01)
*F24F 1/00* (2011.01)

(52) U.S. Cl.
CPC .... *G01J 5/08* (2013.01); *G01J 5/10* (2013.01); *F24F 11/0034* (2013.01); *F24F 1/0007* (2013.01)
USPC ........................................................ 250/353

(58) Field of Classification Search
USPC ........................................................ 250/353
See application file for complete search history.

(56) References Cited

U.S. PATENT DOCUMENTS 5,326,028 A 7/1994 Kano et al.
5,442,178 A * 8/1995 Baldwin ............... 250/353
5,585,631 A 12/1996 Deguchi et al.
2006/0231763 A1* 10/2006 Walters ............... 250/353
2011/0147573 A1 6/2011 Liess et al.

FOREIGN PATENT DOCUMENTS

| DE | 10 2007 039 228 A1 | 2/2009 |
|----|---|---|
| JP | 61-195232 A | 8/1986 |
| JP | 06-074524 A | 3/1994 |
| JP | 06-094535 A | 4/1994 |
| JP | 08-075545 A | 3/1996 |
| JP | 8-152483 A | 6/1996 |

(Continued)

OTHER PUBLICATIONS

Extended European Search Report dated Feb. 15, 2012, issued by the European Patent Office in the corresponding European Application No. 11003498.0. (7 pages).

Office Action dated Apr. 2, 2013, issued by the Chinese Patent Office in the corresponding Chinese Patent Application No. 201110110033.8, and an English translation thereof. (10 pages).

(Continued)

*Primary Examiner* — David Porta
*Assistant Examiner* — Gisselle Gutierrez
(74) *Attorney, Agent, or Firm* — Buchanan Ingersoll & Rooney PC

(57) ABSTRACT

In an infrared sensor 1 including a condenser lens 3 and a multi-element light-receiving unit 2 with a plurality of light-receiving elements 2a to 2h aligned therein on a straight line, a position of receiving an intensity distribution peak of infrared rays which have passed through the condenser lens 3 is deviated from the center position of the multi-element light-receiving unit 2 to a desired light-receiving element position. Especially when the infrared sensor 1 is included in an air conditioner, the position of receiving the intensity distribution peak of the infrared rays is set to the position of a light-receiving element used for detecting heat in a location far from the installment position of the air conditioner.

2 Claims, 29 Drawing Sheets

(56) References Cited

FOREIGN PATENT DOCUMENTS

| | | |
|---|---|---|
| JP | 2006-058228 A | 3/2006 |
| JP | 2006-226988 A | 8/2006 |
| JP | 2007-178301 A | 7/2007 |
| JP | 2008-298665 A | 12/2008 |
| JP | 2009-276126 A | 11/2009 |
| WO | 2009/024277 A2 | 2/2009 |
| WO | WO 2011/120657 A1 | 10/2011 |

OTHER PUBLICATIONS

Office Action dated Aug. 24, 2012, issued in corresponding Chinese Patent Application No. 201110110033.8, and an English Translation (relevant portions only) thereof. (10 pages).

Official Action issued by the Japanese Patent Office on Jul. 16, 2013 in corresponding Japanese Patent Application No. 2010-167071, and an English translation thereof (6 Pgs).

* cited by examiner

Fig. 17

| LIGHT-DISTRIBUTION VIEW ANGLE | DISTANCE(m) OF DETECTABLE FLOOR PORTION FROM AIR CONDITIONER |
|---|---|
| 11a | 32.70~ (SET TO +3.5° ABOVE HORIZONTAL PLANE) |
| 11b | 10.79~32.70 |
| 11c | 6.34~10.79 |
| 11d | 4.39~6.34 |
| 11e | 3.26~4.39 |
| 11f | 2.51~3.26 |
| 11g | 1.97~2.51 |
| 11h | 1.53~1.97 |

INFRARED SENSOR AND AIR CONDITIONER

TECHNICAL FIELD

The present invention relates to an infrared sensor and an air conditioner.

BACKGROUND ART

Air conditioners include an infrared sensor for temperature detection in order to perform control over a temperature, an air volume, a wind direction, for example, according to information on the temperature or presence or absence of a person in a room.

RELATED ART DOCUMENTS

Traditionally, a plurality of infrared sensors are used to detect temperatures of a plurality of regions in a room so as to equalize a temperature distribution in the room in which an air conditioner is installed (refer to Patent Document 1, for example).

Temperature detection using an infrared sensor is improved by other means as well (refer to Patent Documents 2 to 5, for example).

RELATED ART DOCUMENTS

[Patent Document 1] Japanese Published Patent Application No. 61-195232
[Patent Document 2] Japanese Published Patent Application No. 8-152483
[Patent Document 3] Japanese Published Patent Application No. 2006-58228
[Patent Document 4] Japanese Published Patent Application No. 2009-276126
[Patent Document 5] Japanese Published Patent Application No. 2008-298665

SUMMARY OF INVENTION

An embodiment of the present invention aims at providing an infrared sensor having improved temperature detection sensitivity at a desired location, for example.

An infrared sensor according to the present invention may include:
a multi-element light-receiving unit formed of a plurality of light-receiving elements aligned on a straight line; and
a condenser lens; wherein
the multi-element light-receiving unit is disposed at a position of receiving infrared rays which have passed through the condenser lens; and
a position of receiving an intensity distribution peak of the infrared rays which have passed through the condenser lens is deviated from the center of the multi-element light-receiving unit.

Advantageous Effect of the Invention

In the infrared sensor of the present invention, an infrared ray detection sensitivity peak of the multi-element light-receiving unit may be set at a desired position.

BRIEF DESCRIPTION OF DRAWINGS

FIG. 17 is a table showing distances of floor portions capable of being detected by the infrared sensor 1 in the first embodiment from the air conditioner 100;

DESCRIPTION OF EMBODIMENTS

First Embodiment

First, an overview of a first embodiment will be described. An air conditioner (indoor unit) includes an infrared sensor for detecting a temperature while scanning a temperature detection target range. The air conditioner detects a heat source, detects presence of a human or a heat generation device, and controls a temperature, an air volume, and a wind direction.

This infrared sensor is a thermopile sensor, for example.

Figure 1:
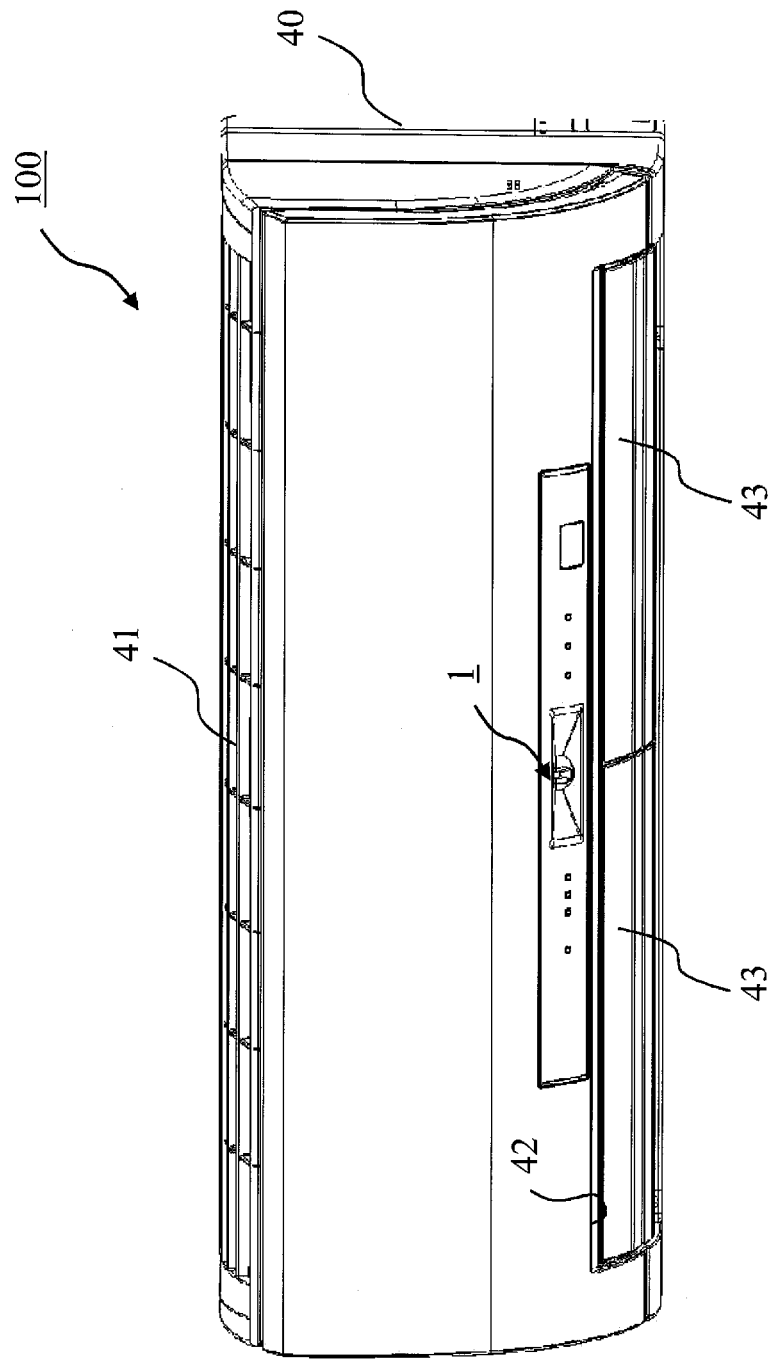
FIG. 1 is a perspective view of an air conditioner 100 in a first embodiment.
Figure 2:
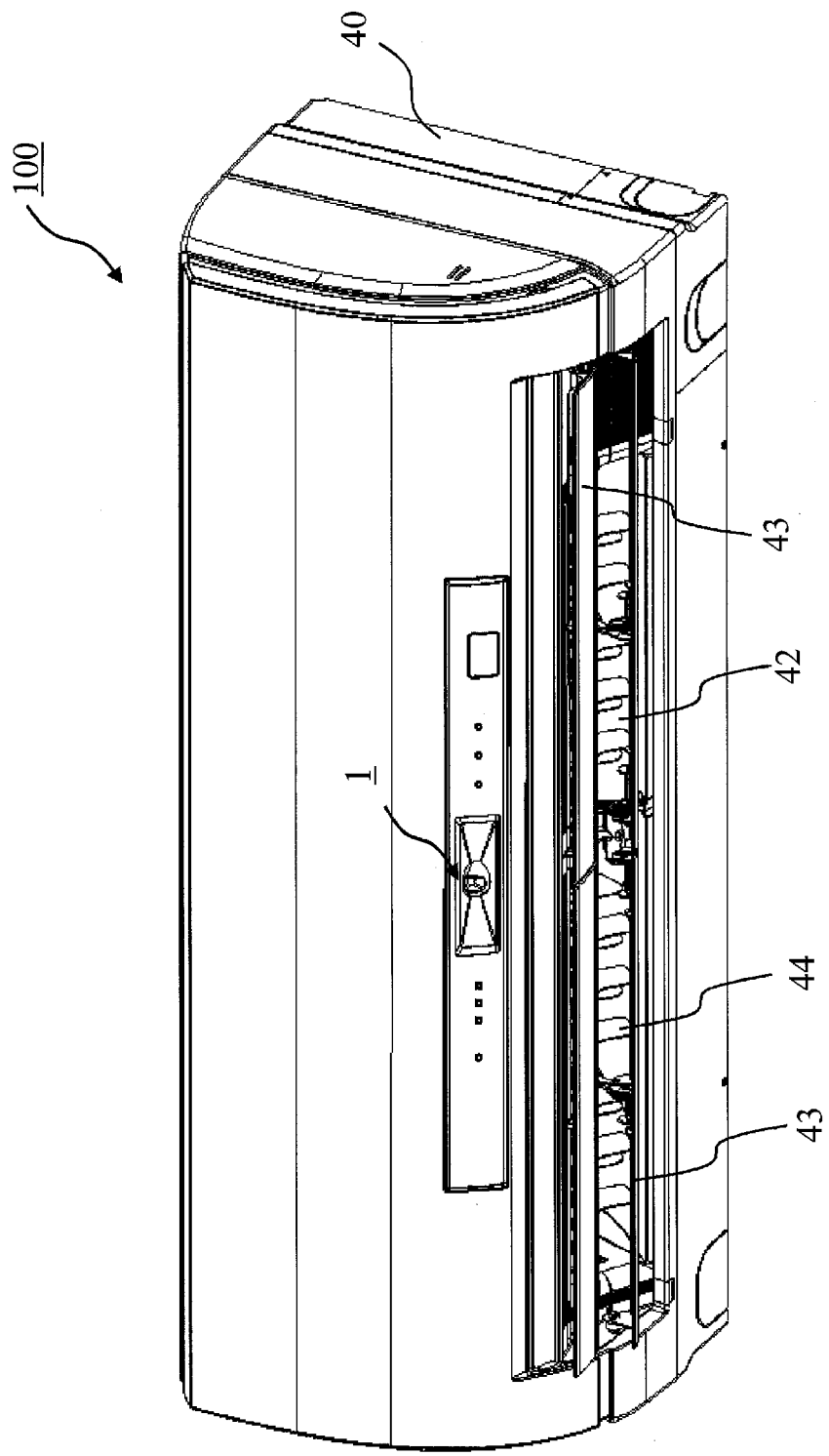
FIG. 2 is a perspective view of the air conditioner 100 in the first embodiment.

An overall configuration of an air conditioner (indoor unit) 100 will be described with reference to FIGS. 1 to 3. Both of FIGS. 1 and 2 are perspective views showing outer appearances of the air conditioner 100. FIG. 1 is different from FIG. 2 in terms of an angle at which the air conditioner 100 is viewed. Further, FIG. 1 is different from FIG. 2 in terms of louvers. Specifically, while upper and lower louvers 43 (which are upper and lower airflow direction control plates disposed on the right and left sides of the air conditioner 100) on the page of FIG. 1 are closed, the upper and lower louvers 43 are opened and inner right and left louvers 44 (which are right and left airflow direction control plates and are large in number) are seen on the page of FIG. 2.

Figure 3:
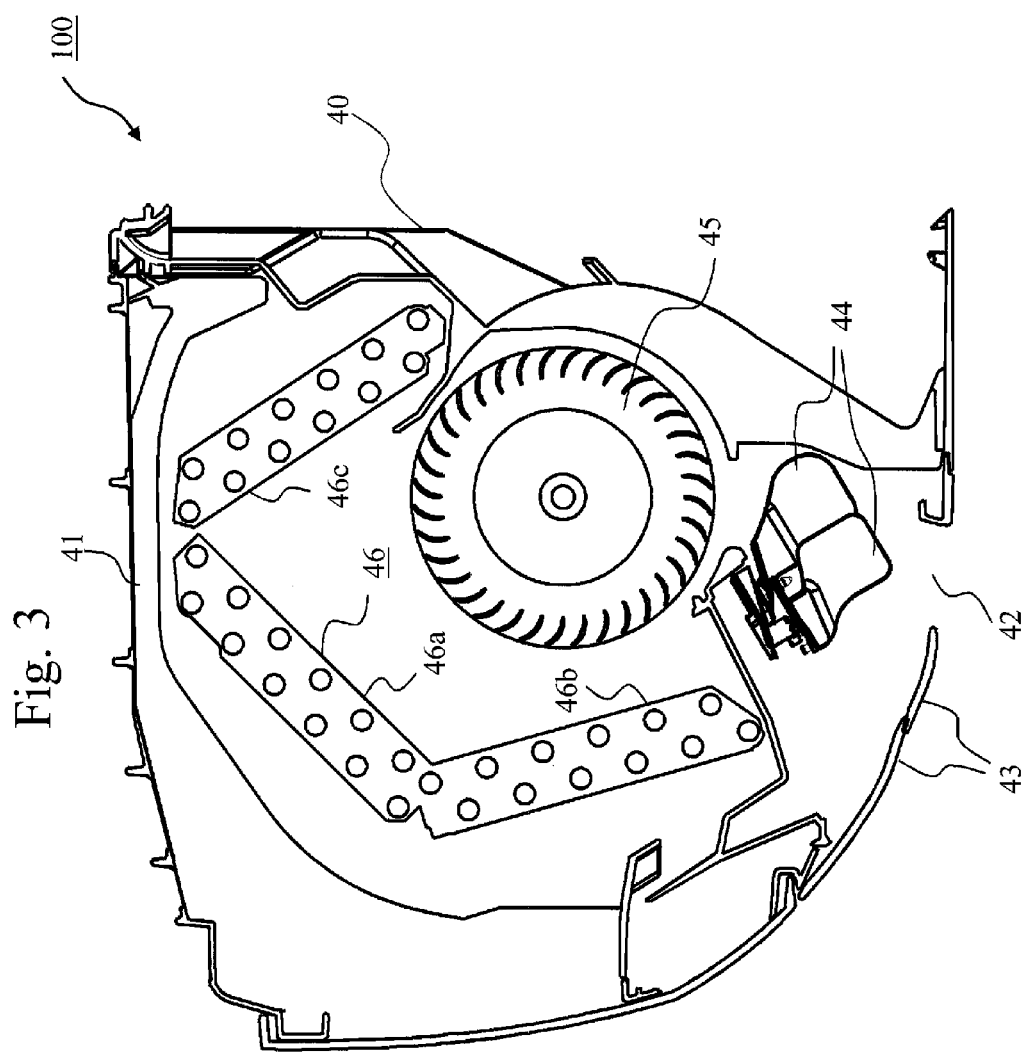
FIG. 3 is a longitudinal cross sectional view of the air conditioner 100 in the first embodiment.

FIG. 3 is a longitudinal cross sectional view of the air conditioner 100.

As shown in FIGS. 1 to 3, an air suction port 41 for taking in air of a room is formed in an upper surface of a generally box-type indoor unit housing 40 (which is hereinafter defined as a main body) of the air conditioner (indoor unit) 100.

An air outlet port 42 for blowing out conditioned air is formed in a lower portion of a front surface of the air conditioner 100. The upper and lower louvers 43 and the right and left louvers 44 are provided for the air outlet port 42, for controlling an airflow direction of the air which will be blown. The upper and lower louvers 43 control upper and lower airflow directions of the air which will be blown, while the right and left louvers 44 control right and left airflow direction of the air which will be blown.

An infrared sensor 1 is provided at a lower portion of the front surface of the indoor unit housing 40. The infrared sensor 1 is disposed above the air outlet port 42. The infrared sensor 1 is attached facing down at a depression angle of approximately 24.5°.

The depression angle is the angle formed between a center axis of the infrared sensor 1 and a horizontal line. In other words, the infrared sensor 1 is attached downwardly at an angle of approximately 24.5° with respect to the horizontal line.

This infrared sensor 1 is driven and scanned on the right and left sides to obtain thermal image data on a room environment.

As shown in FIG. 3, the air conditioner (indoor unit) 100 includes in its inside a blower 45, and a heat exchanger 46 is disposed to cover the blower 45.

For the blower 45, a cross flow fan is used. The cross flow fan includes a fan of a comparatively small diameter. This fan is long in a transverse direction. In the cross flow fan, a flow of air produced by the cross flow fan is not an eddy flow, unlike in a propeller fan, and is a calm layer flow having a width corresponding to the length of the fan. With the cross flow fan, a large air volume with a low static pressure may be obtained.

The cross flow fan is also referred to as a line flow fan (trade mark), a tangential fan, a traverse flow fan, or a through-flow fan. The cross flow fan takes in air from one radial direction of an impeller, and blows air to a radial direction at substantially a right angle (90°) relative to the one radial direction. The length of an air outlet port is thereby readily increased. Accordingly, the cross flow fan is used for an outdoor unit fan of a hung-on-wall type air conditioner, a slit-type air outlet port of a curtain wall unit, and the like.

The heat exchanger 46 is connected to a compressor or the like installed in an outdoor unit (not shown) to form a refrigeration cycle. At a time of a cooling operation, the heat exchanger 46 operates as an evaporator. Then, at a time of a heating operation, the heat exchanger 46 operates as a condenser.

The heat exchanger 46 has a generally inverted V shape as seen from its side. The heat exchanger 46 is constituted from a front-surface upper heat exchanger 46*a*, a front-surface lower heat exchanger 46*b*, and a rear-surface heat exchanger 46*c*.

The heat exchanger 46 is a cross fin tube type heat exchanger constituted from heat transfer pipes and fins.

Indoor air is taken in through the air inlet port 41 by the blower 45. The indoor air is heat exchanged with a refrigerant for the refrigerant cycle by the heat exchanger 46 to generate conditioned air. The conditioned air is blown indoors from the air outlet port 42 through the blower 45.

At the air outlet port 42, up and down, and right and left airflow directions are controlled by the upper and lower louvers 43 and the right and left louvers 44. Referring to FIG. 3, the upper and lower louvers 43 are closed.

Figure 4:
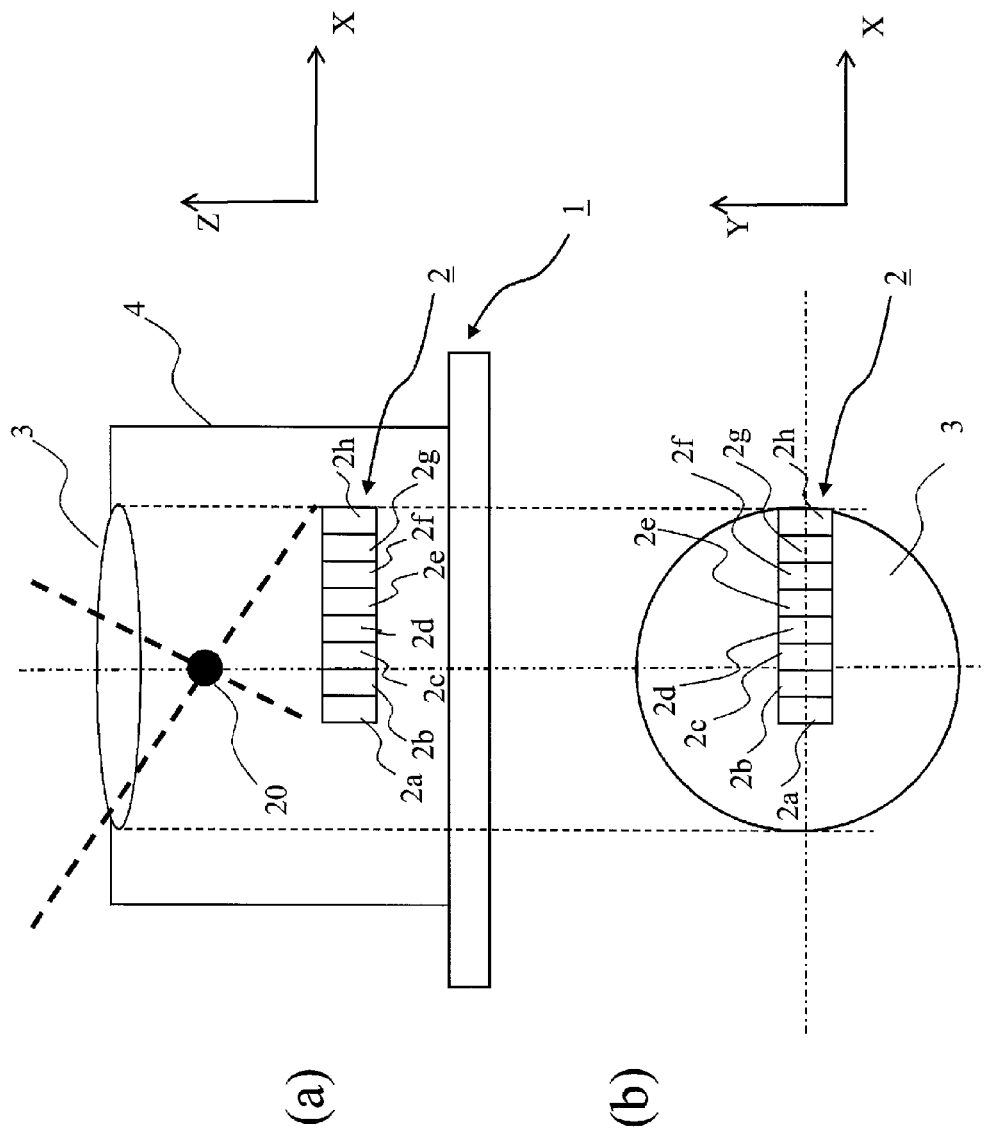
FIG. 4 includes diagrams each showing a structure of an infrared sensor 1 in the first embodiment, in which (a) of FIG. 4 is a sectional view of the infrared sensor 1, and (b) of FIG. 4 is a projection view showing a positional relationship between a condenser lens 3 and a multi-element light-receiving unit 2.

FIG. 4 includes diagrams showing a structure of an infrared sensor for detecting a heat source. Coordinate axes in FIG. 4 indicate an X-Y plane and a height Z.

A sectional view of the infrared sensor 1 is shown in (a) of FIG. 4. In the infrared sensor 1, eight light-receiving elements 2a to 2h are aligned in an X direction inside a metallic can 4, for example, to form a multi-element light-receiving unit 2.

A condenser lens 3 for condensing infrared rays onto the multi-element light-receiving unit 2 with good efficiency is provided on an upper surface of the metallic can 4 or above the multi-element light-receiving unit 2 in a Z direction. The condenser lens 3 is a convex lens, for example.

A projection view showing a positional relationship between the condenser lens 3 and the multi-element light-receiving unit 2 as seen from above the condenser lens 3 is shown in (b) of FIG. 4.

The centers of the condenser lens 3 and the multi-element light-receiving unit 2 are substantially aligned in a Y direction shown in (b) of FIG. 4.

Figure 5:
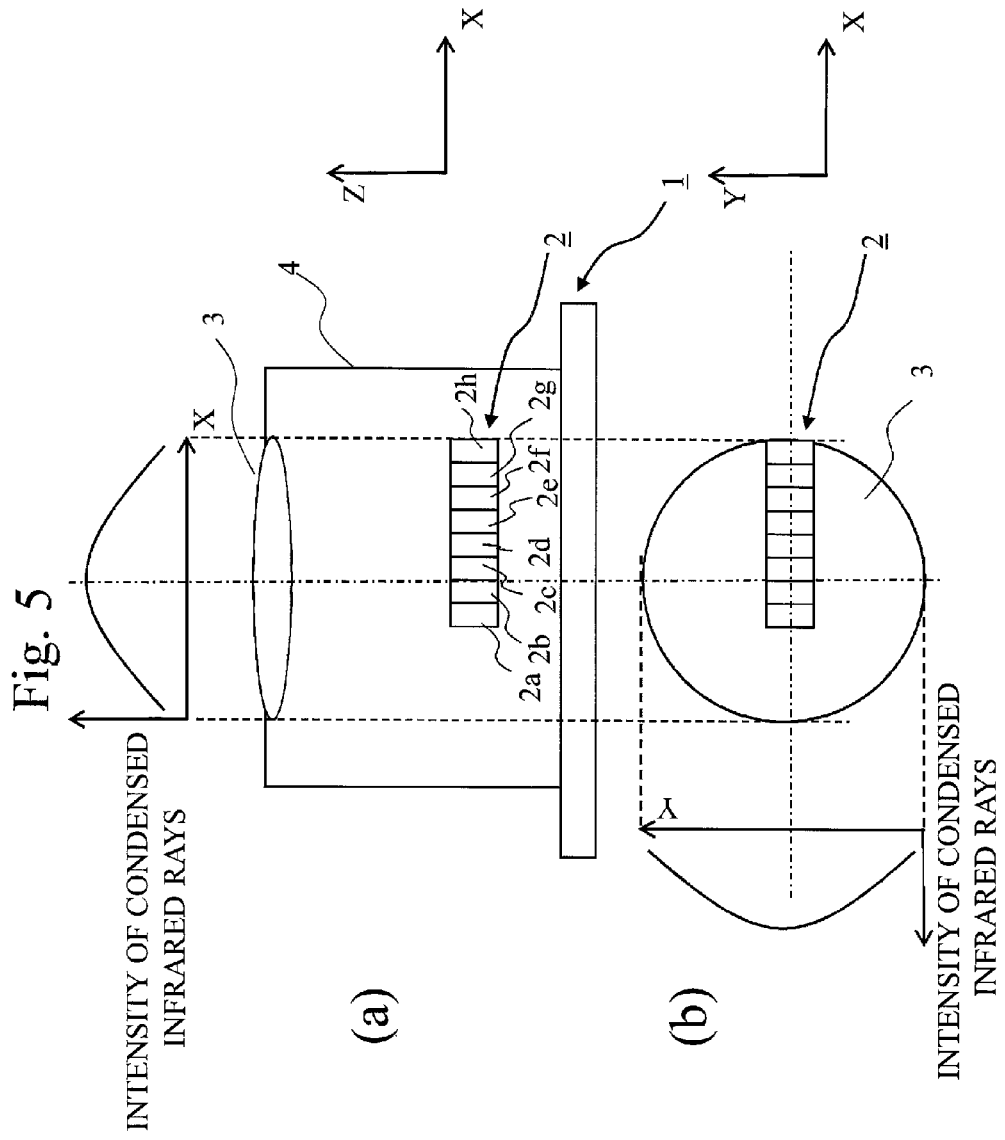
FIG. 5 includes diagrams each showing the structure of the infrared sensor 1 in the first embodiment and an intensity distribution of condensed infrared rays, in which (a) of FIG. 5 is a sectional view, and (b) of FIG. 5 is a projection view showing the positional relationship between the condenser lens 3 and the multi-element light-receiving unit 2.

FIG. 5 includes diagrams showing intensities of infrared rays condensed by the condenser lens 3.

An intensity distribution of the condensed infrared rays in the X direction is shown in (a) of FIG. 5, while an intensity distribution of the condensed infrared rays in the Y direction is shown in (b) of FIG. 5.

When the condenser lens 3 is a circular convex lens as shown in FIG. 5, for example, intensities of condensed infrared rays in both of the X and Y coordinate axis directions shown in FIG. 5 are the strongest at the center of the condenser lens 3, and are reduced more toward an outer periphery of the condenser lens 3.

More specifically, the light-receiving element capable of condensing infrared rays from a detection target most efficiently in terms of light condensing characteristics of the condenser lens 3 in the infrared sensor 1 is the light-receiving element disposed for a central portion of the condenser lens 3.

A peak position of the light or infrared ray intensity distribution in the Y coordinate axis direction shown in FIG. 5 substantially coincides with the center of the multi-element light-receiving unit 2. On the other hand, a peak position of the light or infrared ray intensity distribution in the X coordinate axis direction shown in FIG. 5 deviates from the center of the multi-element light-receiving unit 2. Each of the light-receiving elements 2a to 2h, which form the multi-element light-receiving unit 2, outputs a detection value such as a voltage according to an intensity of light or infrared rays.

The stronger the intensity of light which reaches each of the light-receiving elements 2a to 2h is, the larger the detection value of each of the light-receiving elements 2a to 2h is. Then, detection sensitivity of each of the light-receiving elements 2a to 2h is thereby increased. Accordingly, a detection sensitivity characteristic of each of the light-receiving elements 2a to 2h is plotted, as shown in FIG. 6.

Figure 6:
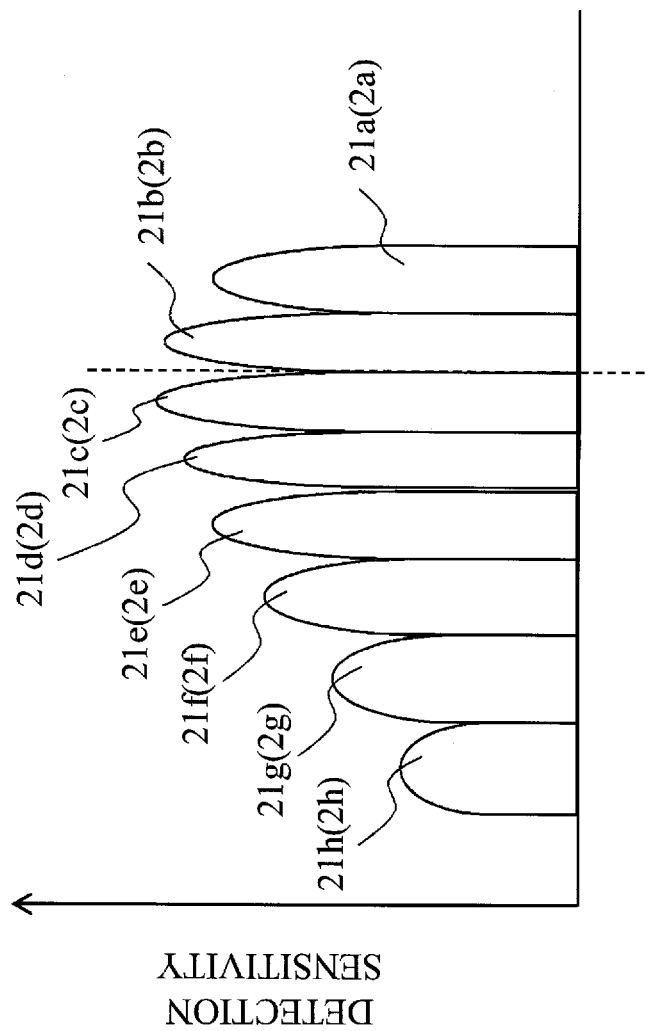
FIG. 6 is a graph showing infrared ray detection sensitivity distributions of the infrared sensor 1 in the first embodiment.

FIG. 6 is a graph showing infrared ray detection sensitivity distributions of the infrared sensor 1. Detection sensitivity 21a indicates the detection sensitivity obtained by the light-receiving element 2a, and detection sensitivity 21h indicates the detection sensitivity obtained by the light-receiving element 2h. FIG. 6 shows that an output responsive to infrared rays obtained from a detection target differs according to the condenser lens 3 and the arranged location of each light-receiving element.

In other words, by deviating the position of the multi-element light-receiving unit 2 for receiving the peak of the intensity distribution of light or infrared rays which has or have passed through the condenser lens 3 from the center of the multi-element light-receiving unit 2, the multi-element light-receiving unit 2 having a desired detection sensitivity characteristic or a detection sensitivity peak at a desired position of the multi-element light-receiving unit 2 may be obtained.

Figure 7:
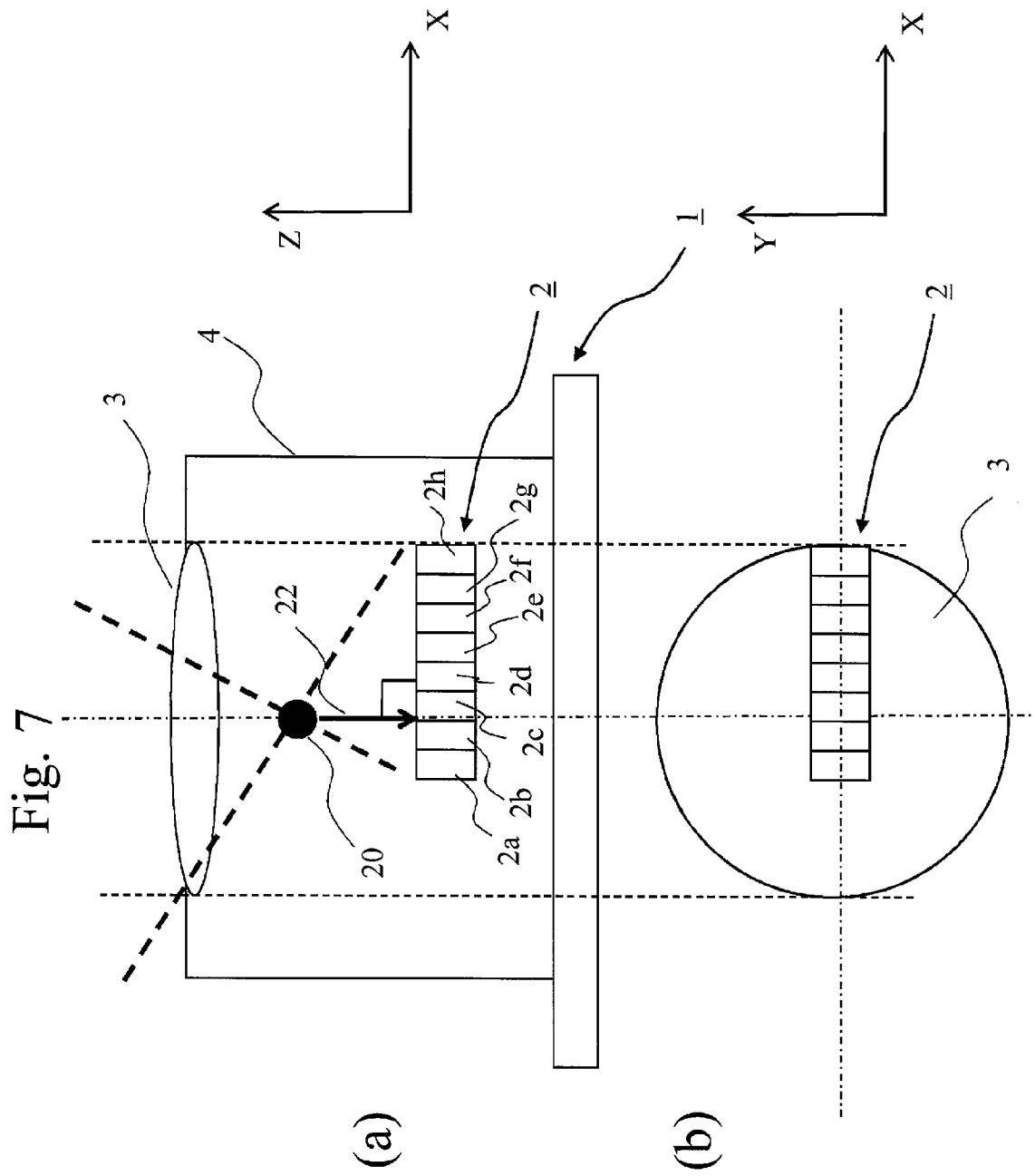
FIG. 7 includes diagrams showing a positional relationship between a focal point 20 of the condenser lens 3 and the multi-element light-receiving unit 2 in the infrared sensor 1, in which (a) of FIG. 7 is a sectional view of the infrared sensor 1, and (b) of FIG. 7 is a projection view showing the positional relationship between the condenser lens 3 and the multi-element light-receiving unit 2.

FIG. 7 includes diagrams showing a positional relationship between a focal point 20 of the condenser lens 3 and the multi-element light-receiving unit 2. The intensity distribution peak of light or infrared rays which has or have passed through the condenser lens 3 can be the position of the focal point 20 of the condenser lens 3. Accordingly, by deviating an intersection between the multi-element light-receiving unit 2 and a perpendicular line 22 from the focal point 20 of the condenser lens 3 to the multi-element light-receiving unit 2 from the center of the multi-element light-receiving unit 2, the configuration in FIG. 5 may be obtained.

The infrared sensor 1 is attached to the air conditioner 100, for example. By including the infrared sensor 1, an air conditioner which is excellent in sensing at a desired location is obtained.

Figure 8:
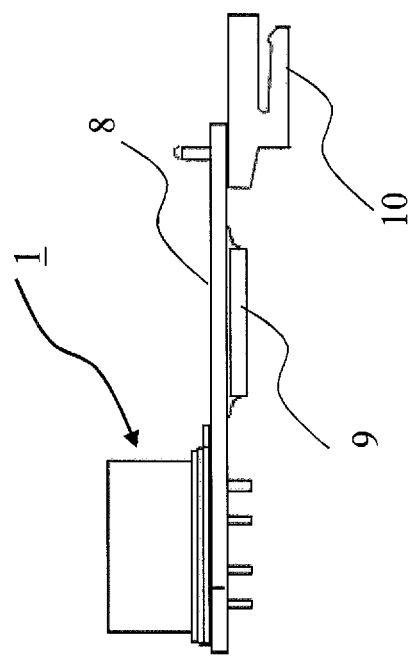
FIG. 8 is a diagram showing a configuration of a portion in the vicinity of the infrared sensor 1 in the first embodiment.

FIG. 8 shows a configuration in the vicinity of the infrared sensor 1. The infrared sensor 1 is mounted on a substrate 8. A sensor output microcomputer 9 for converting an analog output of the infrared sensor 1 to a digital output and a connector 10 for connecting the infrared sensor 1 to the air conditioner 100 are also mounted to the substrate 8.

The infrared sensor 1 obtains thermal image data on an indoor environment, for example, and needs a sensor output from each of the light-receiving elements 2a to 2h which form the multi-element light-receiving unit 2 according to the temperature of a detection target. For that reason, amplification factors are set so that an output level from each of the light-receiving elements 2a to 2h is the same, and the light-receiving elements 2a to 2h are made to have a same signal sensitivity characteristic, by the sensor output microcomputer 9.

Figure 9:
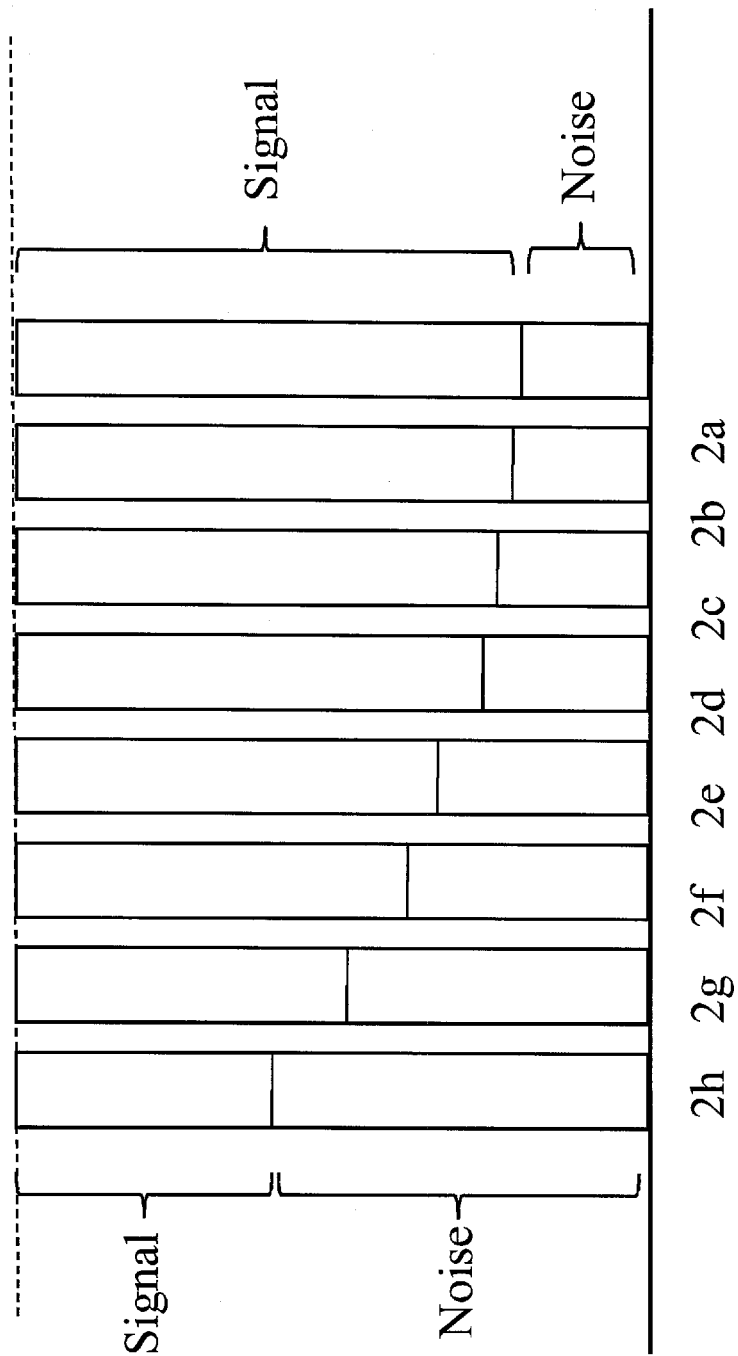
FIG. 9 is a graph showing SN (signal/noise) ratio characteristics of the infrared sensor 1 in the first embodiment.

FIG. 9 shows an SN (signal/noise) ratio characteristic of each of the light-receiving elements 2a to 2h when the amplification factors are set so that the output level from each of the light-receiving elements 2a to 2h is the same. An SN (signal/noise) ratio of each of the light-receiving elements 2a to 2h indicates that the higher a signal ratio is, the better the signal sensitivity characteristic is.

Figure 10:
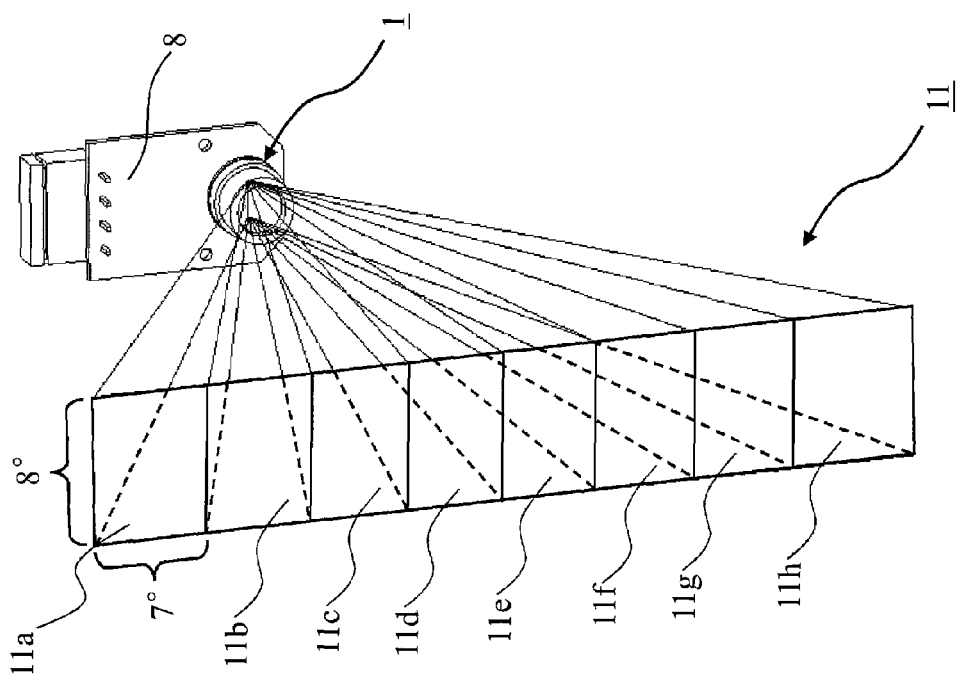
FIG. 10 is a diagram showing the infrared sensor 1 and a light-distribution view angle of each light-receiving element in the first embodiment.

FIG. 10 is a diagram showing light-distribution view angles 11 of respective light-receiving elements.

The air conditioner 100 is installed indoors, for example, and each of the light-receiving elements 2a to 2h which form the multi-element light-receiving unit 2 are arranged in a vertical direction with respect to an indoor floor surface.

Light-distribution view angles 11a to 11h of the light-receiving elements 2a to 2h are all the same, and each of the light-distribution view angles 11a to 11h is constituted from a light-distribution view angle in a vertical direction (vertical light-distribution view angle) of 7° and a light-distribution view angle in a horizontal direction (horizontal light-distribution view angle) of 8°. Though each of the light-distribution view angles 11a to 11h of the light-receiving elements 2a to 2h is herein constituted from the vertical light-distribution view angle of 7°, and the horizontal light-distribution view angle of 8°, the light-distribution view angles are not limited to these specific values. The number of the light-receiving elements is changed according to the light-distribution view angles 11a to 11h of the light-receiving elements 2a to 2h. To take an example, the number of the light-receiving elements may be changed such that the product between the number of the light-receiving elements and the vertical light-distribution view angle of each light-receiving element is constant such as 56°.

Figure 11:
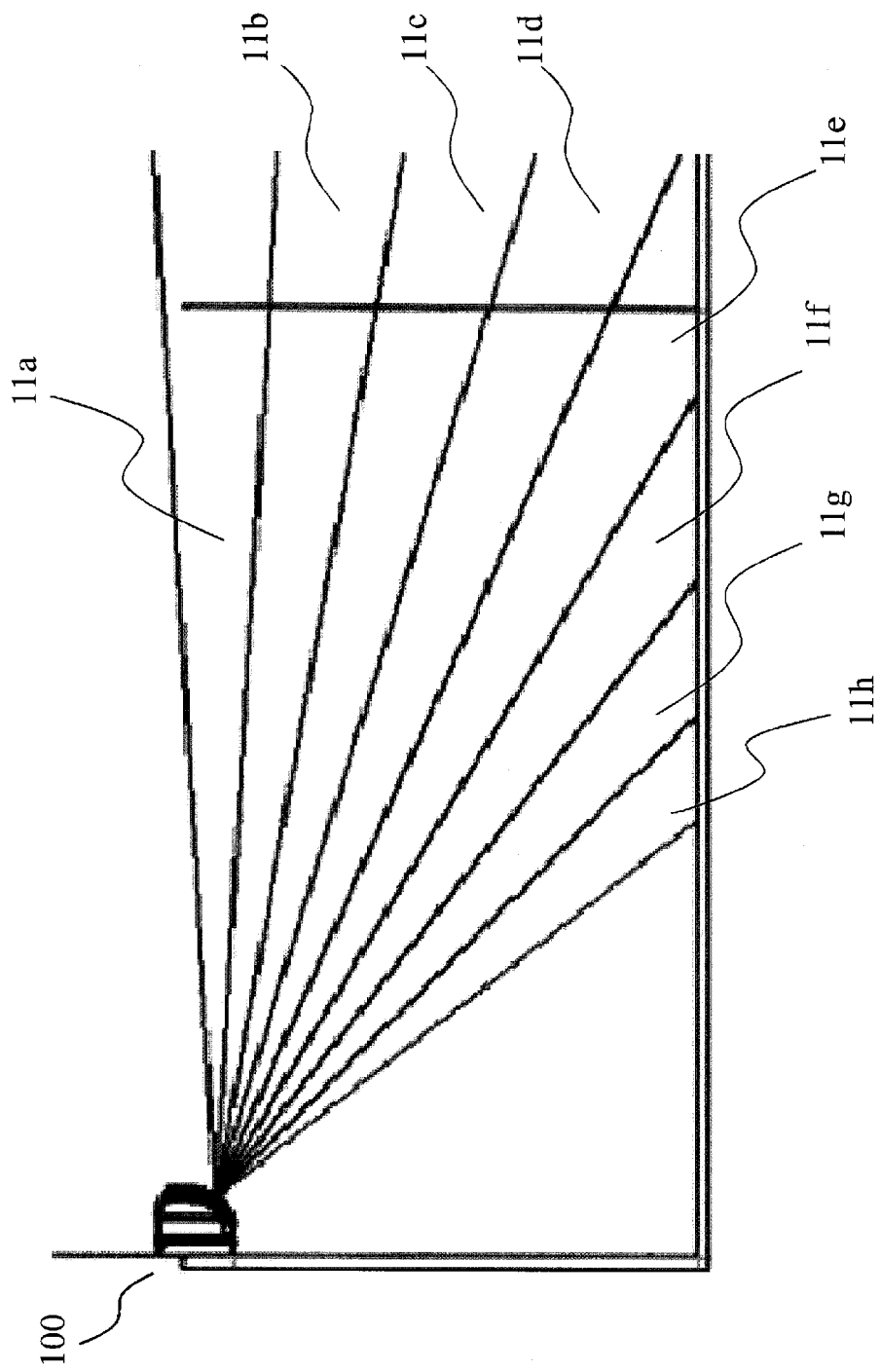
FIG. 11 is a diagram showing vertical light-distribution view angles of the infrared sensor 1 in a longitudinal section plane of the infrared sensor 1 in the first embodiment.

FIG. 11 is a diagram showing vertical light-distribution view angles of the infrared sensor 1 in a longitudinal section plane of the infrared sensor 1. FIG. 11 shows the vertical light-distribution view angles of the infrared sensor 1 in the vertical plane, in which the eight light-receiving elements 2a to 2h are vertically aligned when the air conditioner 100 is installed at an arbitrary height from the floor surface of a room. A distance of detection using the light-distribution view angles 11 is increased more from the light-distribution angle 11h toward the light-distribution view angle 11a.

By arranging the light-receiving elements 2a to 2h in the vertical direction with respect to the indoor floor surface as described above, a temperature at a position in the room located in a direction distant from the air conditioner 100 may be detected, and a detection sensitivity distribution in this direction may be changed.

Figure 12:
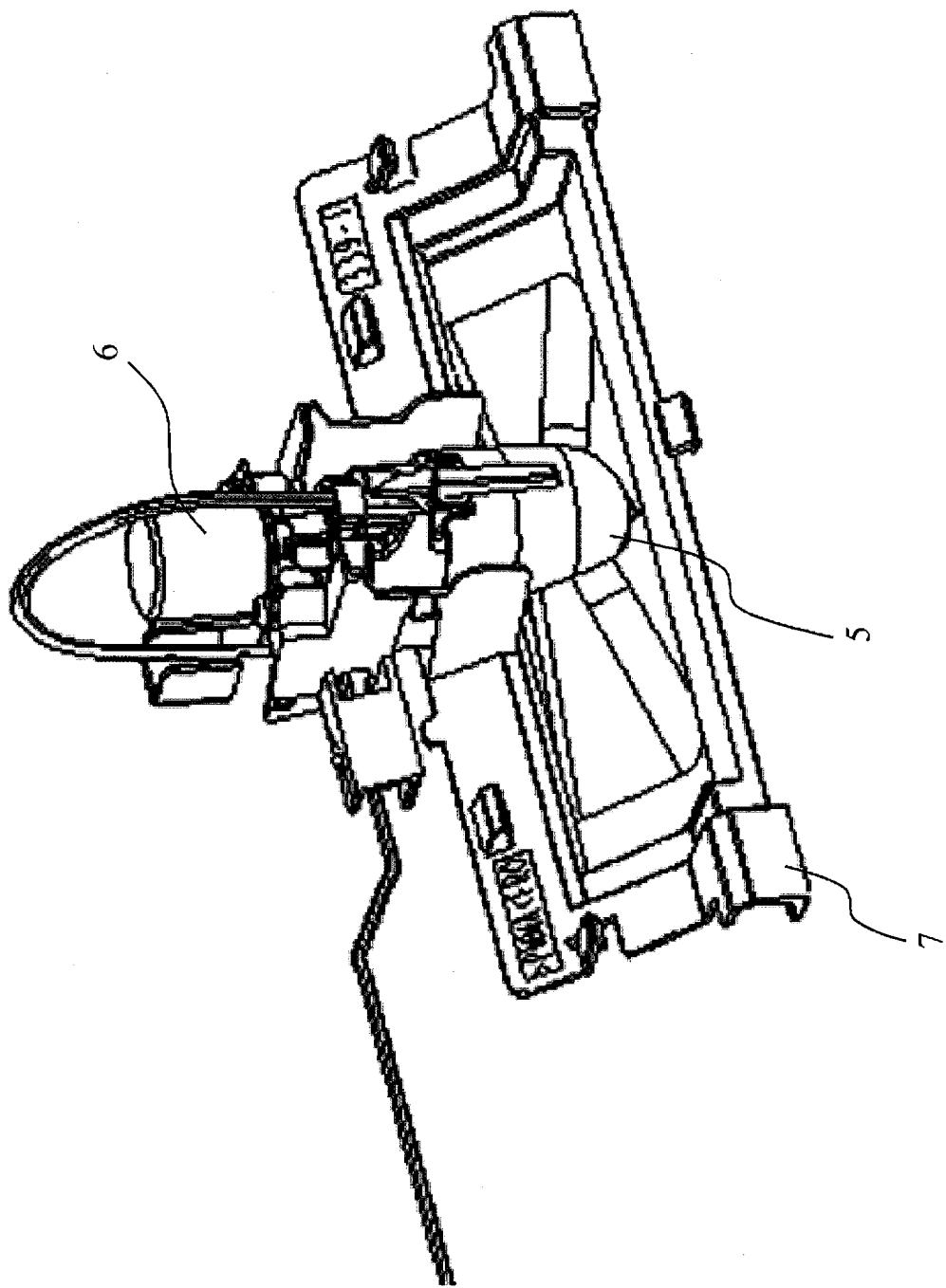
FIG. 12 is a perspective view of a housing 5 for receiving the infrared sensor 1 in the first embodiment.

FIG. 12 is a perspective view of a housing 5 for receiving the infrared sensor 1.

As shown in FIG. 12 in which a portion in the vicinity of the infrared sensor 1 is seen from the rear side (from inside the air conditioner 100), the infrared sensor 1 is placed within the housing 5, being mounted on the substrate 8. Then, a stepping motor 6 for driving the substrate 8 with the infrared sensor 1 mounted thereon is provided on the housing 5. A base 7 unitarily provided with the housing 5 is fixed to a front surface lower portion of the air conditioner 100. The substrate 8 with the infrared sensor 1 mounted thereon is thereby installed on the air conditioner 100. When the infrared sensor 1 is attached to the air conditioner 100, the stepping motor 6 is disposed perpendicular to the housing 5. Then, the infrared sensor 1 is mounted inside the housing 5 downwardly at the depression angle of approximately 24.5 degrees.

The condenser lens 3 is herein a convex lens, for example. The infrared sensor 1 is attached to the air conditioner 100 such that the light-receiving element 2a assigned to the light-distribution view angle 11a positioned at an uppermost position on the page of FIG. 10 is positioned at a lowermost location of the infrared sensor 1 and the light-receiving element 2h assigned to the light-distribution view angle 11h positioned at an lowermost location on the page of FIG. 10 is positioned at an uppermost location of the infrared sensor 1 so as to invert an image by this condenser lens 3.

Figure 13:
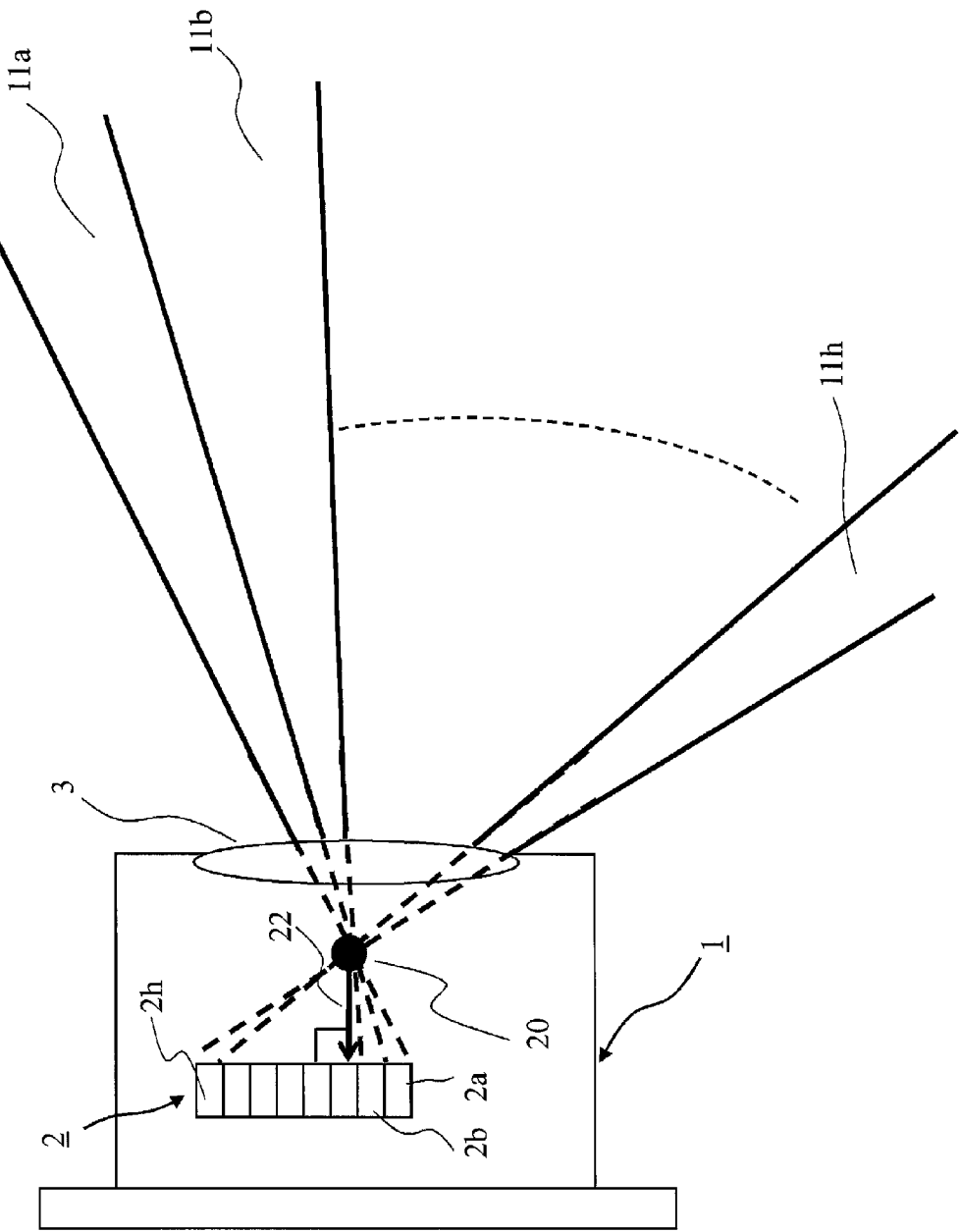
FIG. 13 is a diagram showing positional relationships between respective light-receiving elements 2a and 2h of the infrared sensor 1 and respective vertical light-distribution view angles 11a to 11b in the first embodiment.

Positional relationships between the respective light-receiving elements 2a to 2h and respective light-distribution view angles 11a to 11b are as shown in FIG. 13.

An intersection between the multi-element light-receiving unit 2 and the perpendicular line 22 from the focal point 20 of the condenser lens 3 to the multi-element light-receiving unit 2 is positioned at a position of a lower half of the whole length of the multi-element light-receiving unit 2.

Figure 14:
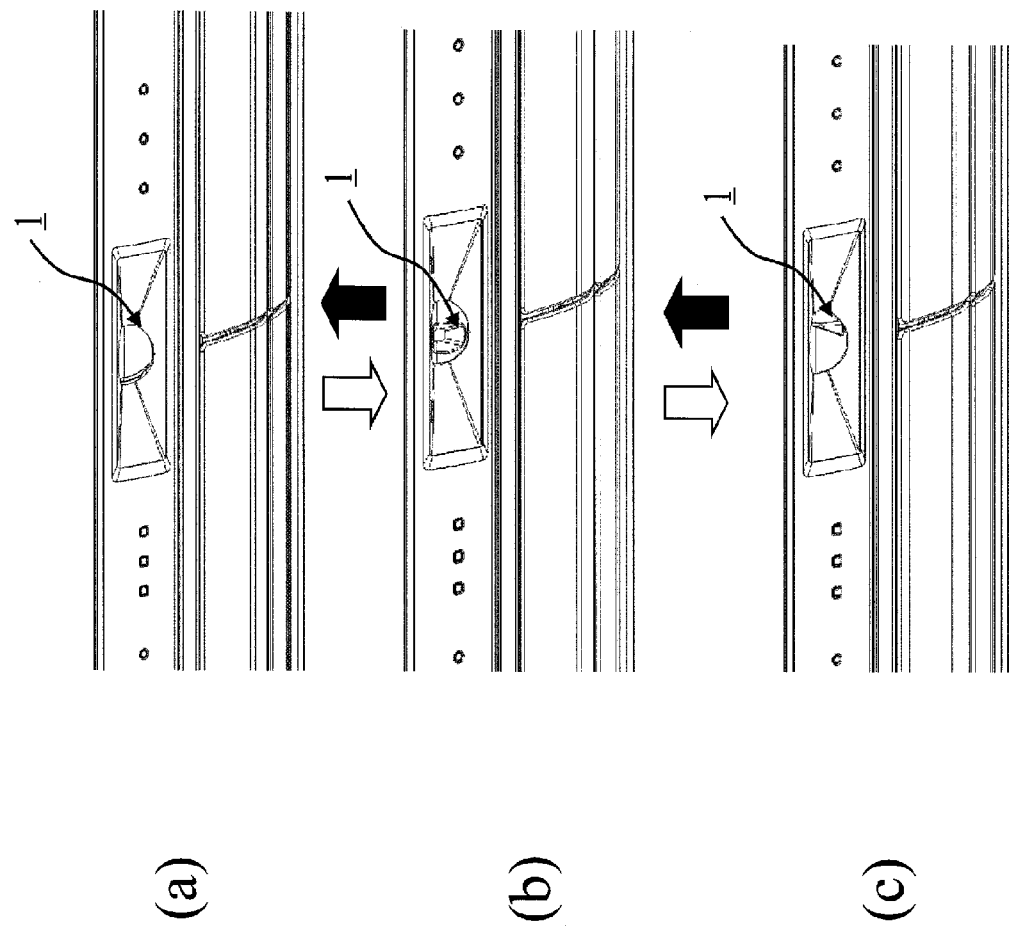
FIG. 14 includes perspective views of a portion in the vicinity of the infrared sensor 1 in the first embodiment, in which (a) of FIG. 14 shows a state where the infrared sensor 1 has moved to a right end portion, (b) of FIG. 14 shows a state where the infrared sensor 1 has moved to a central portion, and (c) of FIG. 14 shows a state where the infrared sensor 1 has moved to a left end portion.

FIG. 14 is a perspective view showing a portion in the vicinity of the infrared sensor 1. The infrared sensor 1 is rotably driven within a predetermined angle range in right and left directions by the stepping motor 6 (such a rotatable driving movement is herein expressed as "moving"). The infrared sensor 1 moves from a right end portion (a) to a left end portion (c) through a central portion (b), as shown in FIG. 14 (in which this movement is indicated by blank arrows), for example.

When the infrared sensor 1 reaches the left end portion (c), reverses its movement, and then moves to the right end portion (a) from the left end portion (c) through the central portion (b), as shown in FIG. 14 (in which this movement is indicated by black arrows). The infrared sensor 1 repeats this movement.

The infrared sensor 1 detects a temperature of a temperature detection target while scanning a temperature detection target range in right and left directions of the room. The right and left directions are herein those seen from the air conditioner 100.

A method of obtaining thermal image data on a wall or a floor of the room by the infrared sensor 1 will be described. Control over the infrared sensor 1 and the like is performed by a microcomputer programmed with a predetermined operation. The microcomputer programmed with the predetermined operation is herein defined as a control unit. In the following description, a description that each control is performed by the control unit (microcomputer programmed with the predetermined operation) will be omitted.

When obtaining the thermal image data on the wall or the floor of the room, the infrared sensor 1 is moved in the right and left direction by the stepping motor 6. Then, the infrared sensor 1 is stopped for a predetermined period of time (0.1 to 0.2 seconds) at each position for every moving angle (rotable driving angle of the infrared sensor 1) of 1.6° of the stepping motor 6.

After the infrared sensor 1 has been stopped, waiting is performed for a predetermined period of time (shorter than 0.1 to 0.2 seconds). Then, detection results of (thermal image data on) the eight light-receiving elements of the infrared sensor 1 are loaded.

After completion of loading of the detection results of the infrared sensor 1, the stepping motor 6 is driven (at the moving angle of 1.6°) and is then stopped. Detection results of (thermal image data on) the eight light-receiving elements of the infrared sensor 1 are loaded using the same operation.

The above-mentioned operation is repeated, and computation on the thermal image data within a detection area is performed, on the basis of the detection results of the infrared sensor 1 at 94 positions in the right and left directions.

Since the infrared sensor 1 is stopped at the 94 positions for every moving angle of 1.6° of the stepping motor 6 to load the thermal image data, the moving range of the infrared sensor 1 (angle range at which the infrared sensor 1 is rotably driven in the right and left direction) is approximately 150.4°.

Figure 15:
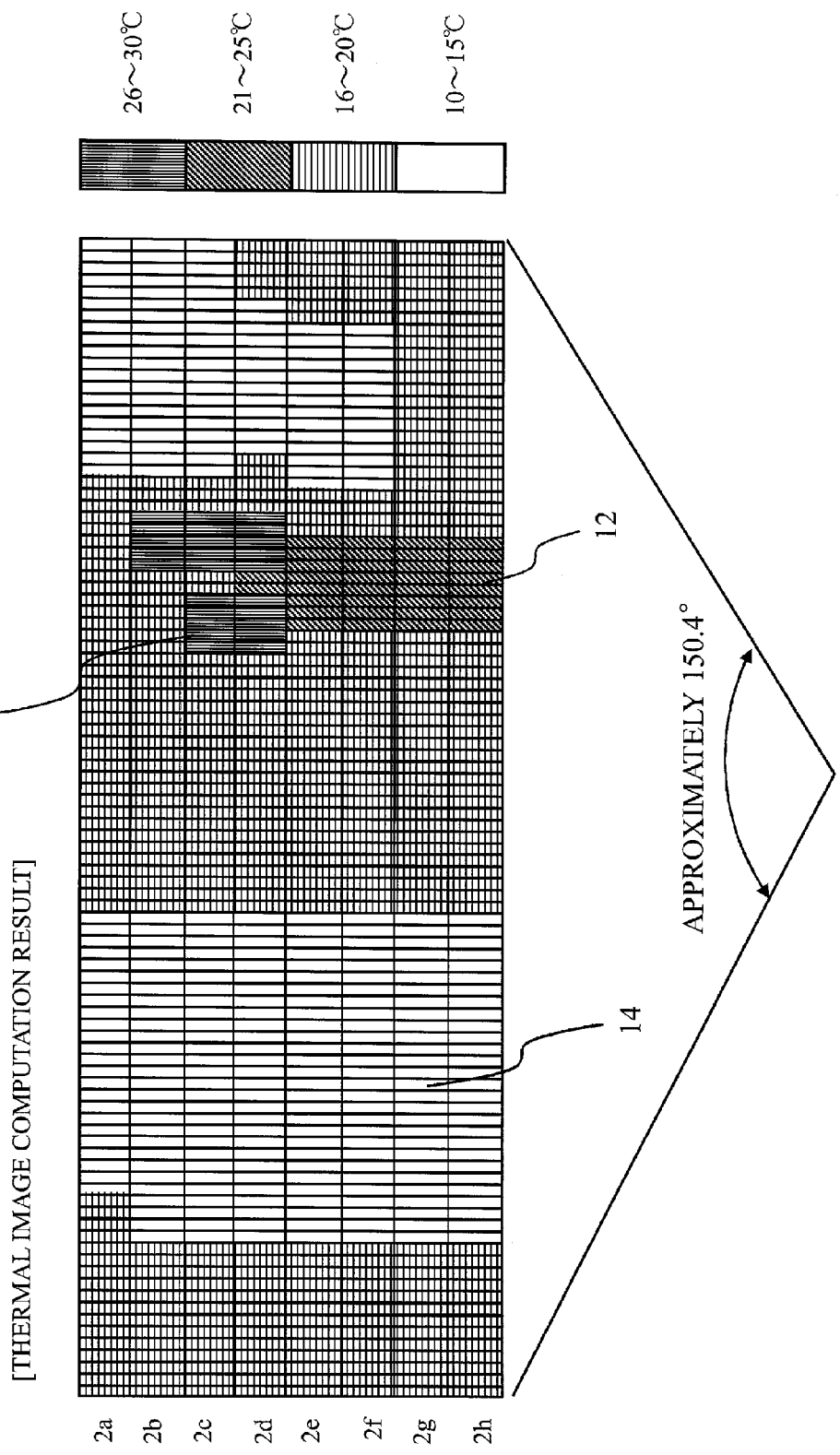
FIG. 15 is a diagram showing thermal image data on a room in which a housewife 12 carries an infant 13 in the first embodiment.

FIG. 15 shows thermal image data in a life scene in which a housewife 12 carries an infant 13. The thermal image data is obtained by computation on detection results of the infrared sensor 1 having the vertical light-distribution view angles as shown in FIG. 11, for example. The infrared sensor 1 has been moved in the moving range of approximately 150.4° in the right and left directions to output the detection results.

An uppermost row of the image data is data on a location far from the infrared sensor 1 detected by the light-receiving element 2a. A second row of the image data from the top among rows of the image data is data detected by the light-receiving element 2b, and a lowermost row of the image data is data on a location close to the infrared sensor 1 detected by the light-receiving element 2h.

A human who has appeared within a living space in the room may be detected by computing a difference between thermal image data obtained for each predetermined period of time.

FIG. 15 shows the thermal image data obtained in a cloudy day in winter. Accordingly, a temperature of a window 14 ranges from 10 to 15° C., which is low. Temperatures of the housewife 12 and the infant 13 are the highest. Temperatures of upper bodies of the housewife 12 and the infant 13 range from 26 to 30° C. By moving the infrared sensor 1 in the right and left directions, temperature information on each portion of the room, for example, may be obtained.

Figure 16:
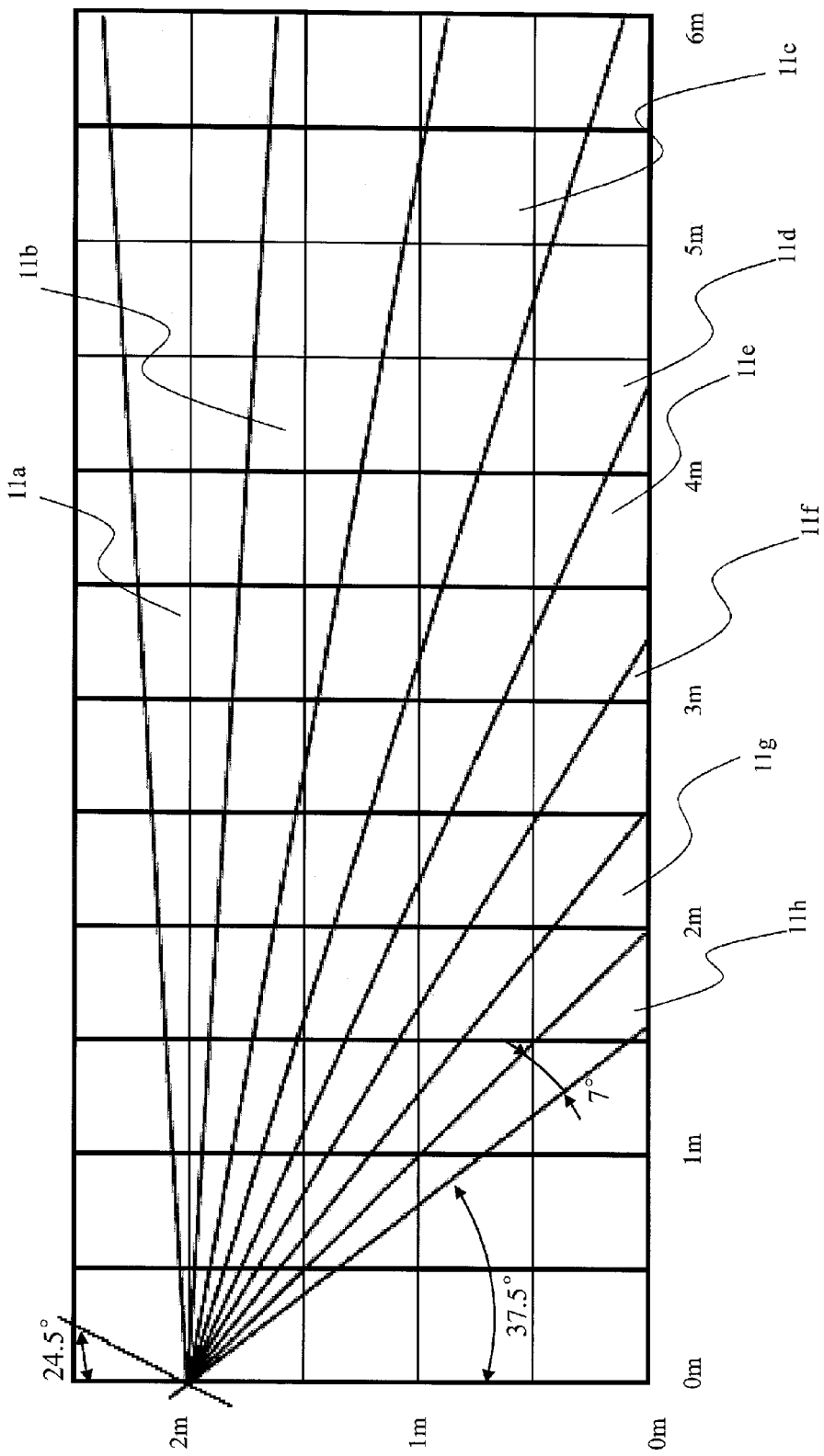
FIG. 16 shows the vertical light-distribution view angles of the infrared sensor 1 in the longitudinal section plane of the infrared sensor 1 and specific numerical values in the first embodiment.

FIG. 16 shows FIG. 11 in further detail, using specific numerical values. Referring to FIG. 16, a vertical axis indicates a height, while a horizontal axis indicates a distance from the surface of the wall on which the air conditioner 100 is installed.

FIG. 16 shows the vertical light-distribution view angles of the infrared sensor 1 in the longitudinal section plane of the infrared sensor 1 in which the eight light-receiving elements are vertically aligned when the air conditioner 100 is installed at the height of 2 m from the floor surface of the room.

An angle of 7° shown in FIG. 16 is the vertical light-distribution view angle of each light-receiving element.

A view field angle of the infrared sensor 1 formed of the eight light-receiving elements is therefore 56°.

An angle of 37.5° in FIG. 16 shows an angle from the wall on which the air conditioner 100 has been installed in a region not included in the vertical field of view of the infrared sensor 1. If the depression angle of the infrared sensor 1 is 0°, this angle becomes 90°−4 (number of the light-receiving elements below the horizontal line)×7° (vertical light-distribution view angle of each light-receiving element)=62°. Since the depression angle of the infrared sensor 1 in this embodiment is 24.5°, this angle from the wall becomes 62°−24.5°=37.5°.

FIG. 17 is a table showing distances of floor portions capable of being detected by the infrared sensor 1 from the air conditioner 100.

Due to the light-distribution view angles 11a to 11h respectively corresponding to the light-receiving elements 2a to 2h, the distances of floor portions capable of being detected by the infrared sensor 1 are as shown in FIG. 17.

Figure 18:
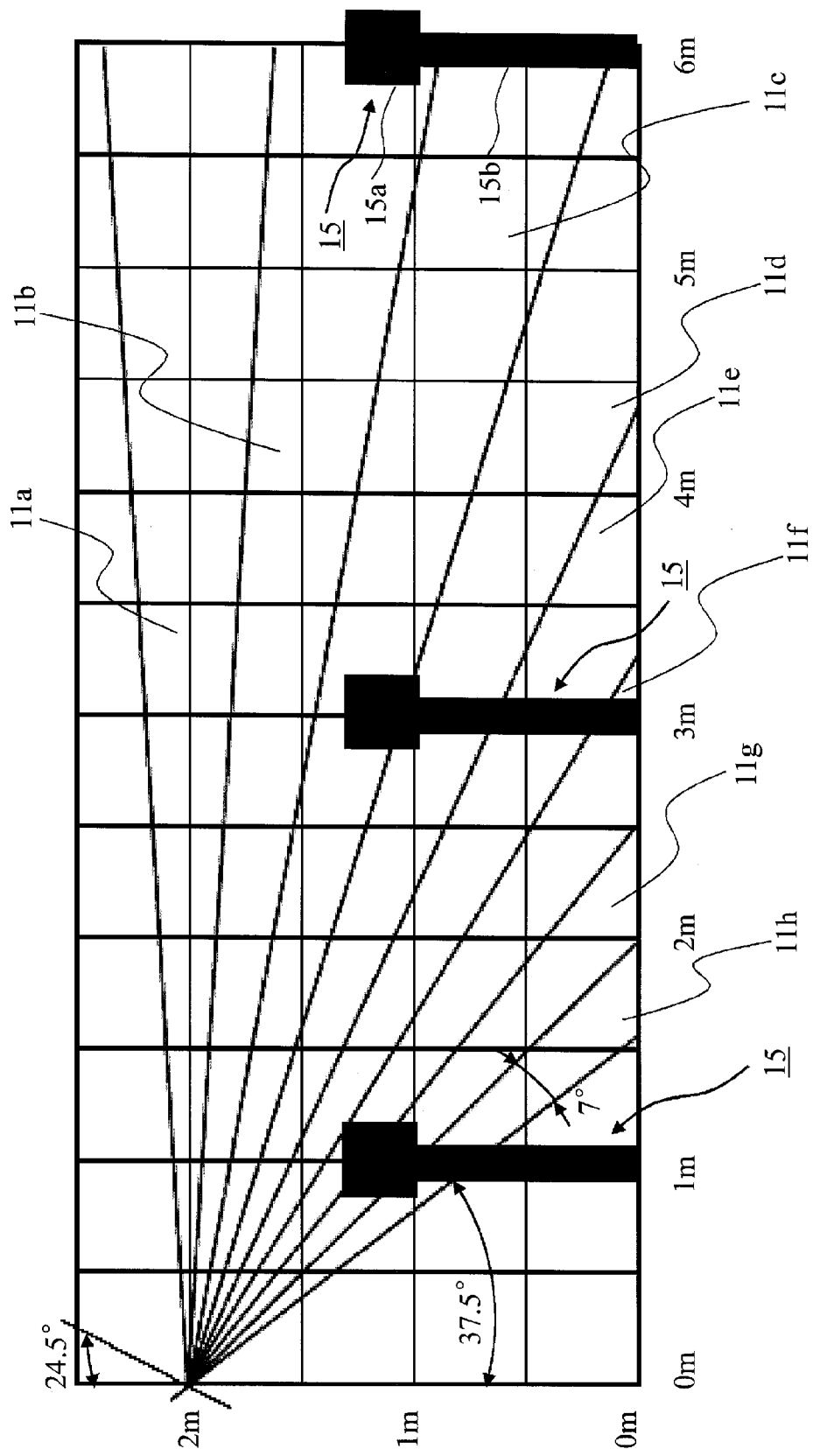
FIG. 18 is a graph showing the vertical light-distribution view angles of the infrared sensor 1 in the longitudinal section plane of the infrared sensor 1 in the first embodiment and sitting human body models 15 disposed on floor portion.

FIG. 18 shows the vertical light-distribution view angles of the infrared sensor 1 in the longitudinal section plane of the infrared sensor 1, and shows sitting human models 15 disposed on floor portion. FIG. 18 shows the adult sitting human models 15 at locations of 1 m, 3 m, and 6 m from the wall surface on which the air conditioner is installed under the same conditions as in FIG. 16. A head position of the adult sitting human model 15 is indicated by reference numeral 15a, while a body portion of the adult sitting human model 15 is indicated by reference numeral 15b.

When detecting the subject sitting in a location of 1 m from the installment position of the air conditioner, for example, detection is performed using the light-distribution view angles 11h, 11g, and 11f. On the other hand, when detecting the subject sitting in a location of 6 m, which is far from the installment position of the air conditioner, for example, detection is performed using the light-distribution view angles 11b and 11c. In that case, the more a detection distance of the infrared sensor extends, the more a field-of-view range of each sensor element increases in view of characteristics of the infrared sensor. Accordingly, a ratio of the area occupied by the subject to the area of detection by the sensor tends to be reduced, making it all the more difficult to perform detection by the sensor.

Needless to say, the sensitivity characteristic of the infrared sensor needs to be greatly improved so as to detect a user in a living room. However, formation of the sensor using very expensive members makes no sense.

SN (signal/noise) ratios of the light-distribution view angles 11b and 11c need to be greatly improved in order to cause the infrared sensor having the light-distribution view angles in FIG. 10 to detect the human body model sitting in the location of 6 m from the installation position of the air conditioner shown in FIG. 18. This means improvement of sensitivity of the light-receiving elements as a whole, which may encounter a great problem of an increase in cost or the like.

In order to overcome this problem, the metallic can 4 and the condenser lens 3 are used without alteration, and the position of the multi-element light-receiving unit 2 is deviated so that the SN (signal/noise) ratios of the upper light-distribution view angles of the infrared sensor 1 on the page of FIG. 18 such as the light-distribution view angles 11a to 11d are the most efficient. The upper light-distribution view angles are used to detect a human body sitting in a location which is far from the installment position of the air conditioner 100.

That is, as shown in FIG. 4, the multi-element light-receiving unit 2 is disposed such that the intersection between the multi-element light-receiving unit 2 and the perpendicular line from the strongest intensity position of the condensed infrared rays (or the focal point of the condenser lens 3) to the multi-element light-receiving unit 2 is interposed between the light-receiving elements 2a and 2d respectively corresponding to the light-distribution view angles 11a to 11d.

In other words, the multi-element light-receiving unit 2 of the infrared sensor 1 attached to the air conditioner 100 is disposed such that the intersection between the multi-element light-receiving unit 2 and the perpendicular line from the focal point of the condenser lens 3 to the multi-element light-receiving unit 2 is located at a position of a lower half of the whole length of the multi-element light-receiving unit.

By improving detection sensitivity of the lower half portion of the multi-element light-receiving unit 2 disposed in the vertical direction as described above, a characteristic of the infrared sensor 1 which is excellent in detecting a far location may be obtained.

When further limitation is imposed, the position of the multi-element light-receiving unit 2 is deviated such that the SN (signal/noise) ratios of the light-distribution view angles 11b and 11c for detecting the human body model sitting in a detection distance of 6 m are the most efficient.

That is, as shown in FIG. 4, the multi-element light-receiving unit 2 is disposed such that an intermediate position between the light-receiving elements 2b and 2c respectively corresponding to the light-distribution view angles 11b and 11c is located in the position of the intersection between the multi-element light-receiving unit 2 and the perpendicular line from the strongest intensity position of the condensed infrared rays or the focal point of the condenser lens 3 to the multi-element light-receiving unit 2.

In other words, the multi-element light-receiving unit 2 of the infrared sensor 1 attached to the air conditioner 100 is disposed such that the intersection between the multi-element light-receiving unit 2 and the perpendicular line from the focal point of the condenser lens 3 to the multi-element light-receiving unit 2 is located at a position of approximately a lower one-fifth of the whole length of the multi-element light-receiving unit 2.

With this arrangement, the incident infrared ray sensitivity characteristic of each of the light-receiving elements 2a to 2h shown in FIG. 6 is obtained.

Likewise, the SN (signal/noise) ratio characteristic of each of the light-receiving elements 2a to 2h shown in FIG. 9 is obtained.

Figure 19:
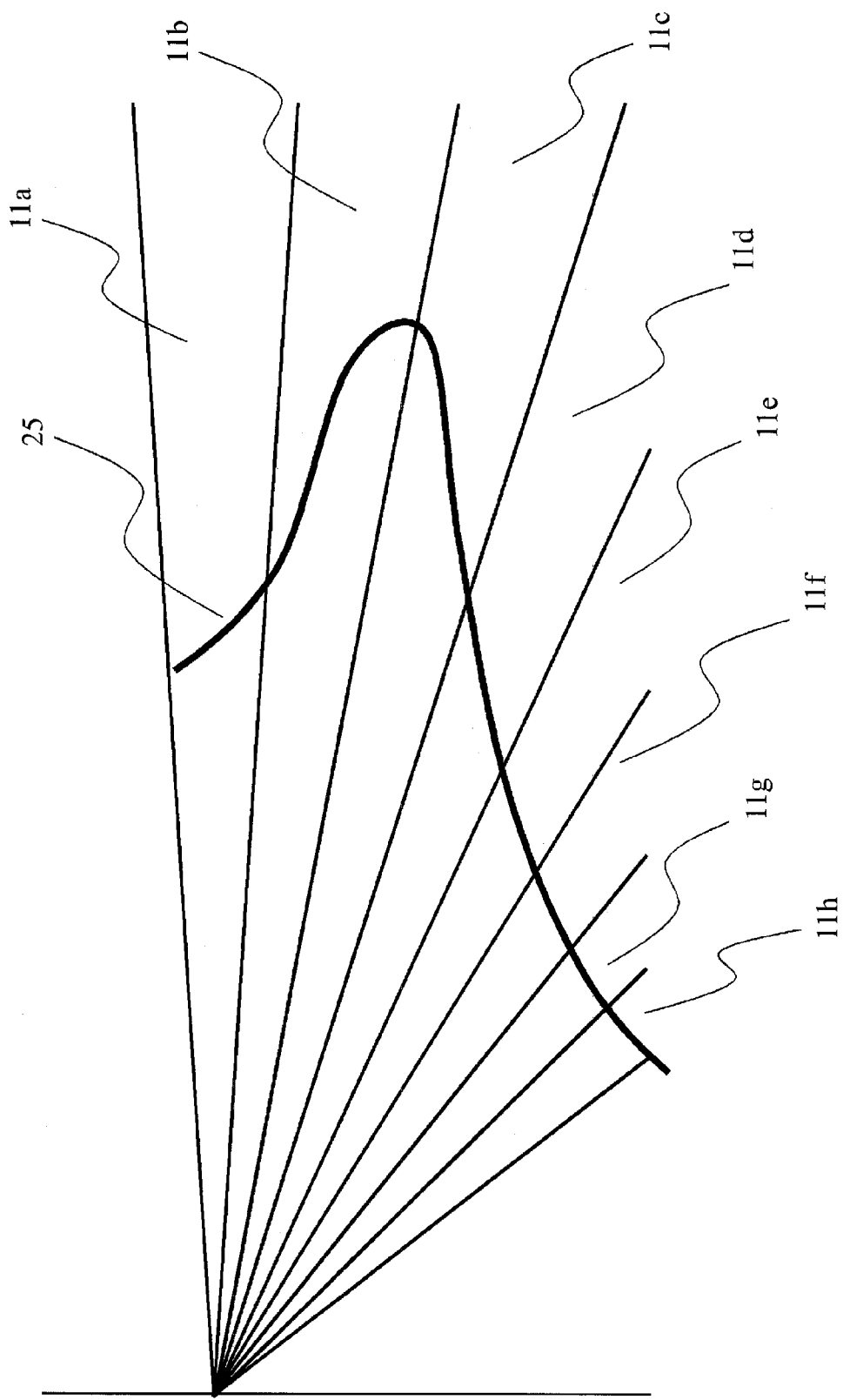
FIG. 19 is a diagram showing a light-distribution sensitivity characteristic of the infrared sensor 1.

FIG. 19 is a diagram showing a light-distribution sensitivity characteristic of the infrared sensor 1. Referring to FIG. 19, light reception sensitivity 25 of the multi-element light-receiving unit 2 or light reception sensitivity 25 of each of the light-receiving elements 2a to 2h is added to the light-distribution view angles 11a to 11h.

By deviating arrangement of the light-receiving elements 2a to 2h of the infrared sensor 1, a detection distance is expanded, and a human detection function needed for a presence sensor attached to the air conditioner is optimized. Detection accuracy may be thereby greatly improved, and amenity may be thereby provided within a spacious living room.

Specifically, the infrared sensor 1 is excellent in detecting a human body with a height of 1 m in a distance of 6 m from the installation position of the air conditioner 100.

Deviation of the position of the multi-element light-receiving unit 2 may cause reduction of sensitivity of the light-receiving element of the infrared sensor 1 for detecting a location near the air conditioner 100. However, as seen from the light distribution characteristics in FIG. 18 as well, the human body sitting in the near distance of 1 m from the installation position of the air conditioner 100 may be detected by light distribution using the light-distribution view angles 11f to 11h. That is, when detecting a subject heat source in a near distance by the infrared sensor 1, deterioration of SN (signal/noise) ratios of the light-receiving elements in the near distance resulting from deviation of light-receiving element arrangement may be sufficiently compensated for by a great increase in the number of the light-distribution view angles used for detecting the subject heat source, or an increase of the ratio of the area occupied by the subject heat source to the area of detection by the infrared sensor 1. Thus, there arises no problem, and detection resolution is not lowered.

Next, a description will be directed to a method of obtaining a light-receiving element for detecting a human body sitting in an arbitrary distance D from the installment position of the air conditioner, using mathematical expressions.

Figure 20:
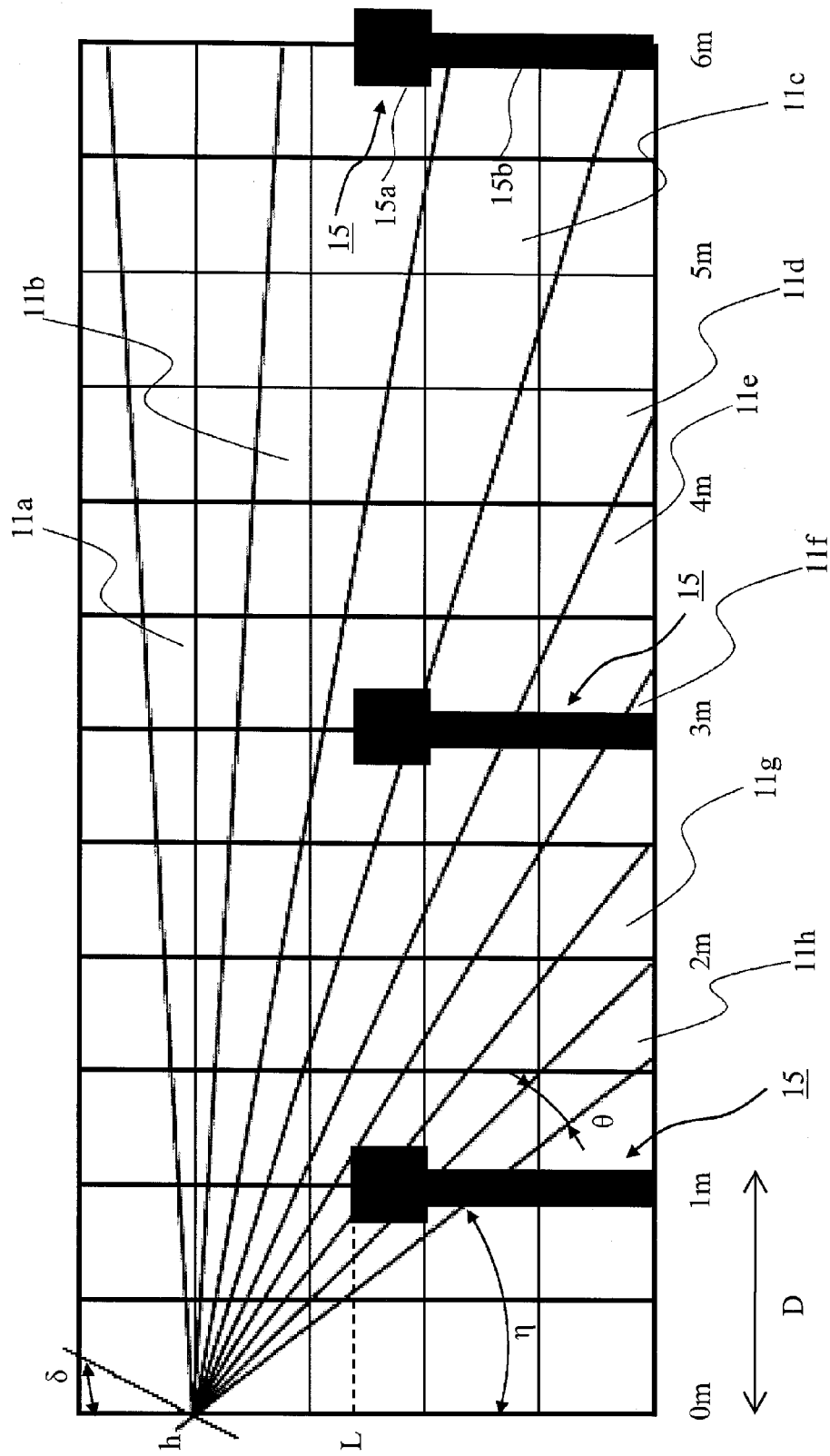
FIG. 20 shows the vertical light-distribution view angles of the infrared sensor 1 in the longitudinal section plane of the infrared sensor 1, and is generalized using symbols and constants, in the first embodiment.

FIG. 20 shows vertical light-distribution view angles of the infrared sensor 1 in a longitudinal section plane of the infrared sensor 1, and is generalized using symbols and constants.

When the depression angle of the infrared sensor 1 is set to δ, a light-distribution view angle per light-receiving element is set to θ, an installment height of the air conditioner 100 or the infrared sensor 1 is set to h, and the number of the light-receiving elements forming the multi-element light-receiving unit 2 is set to N as shown in FIG. 20, an angle η of the region not included in the vertical field of view of the infrared sensor 1 is given as follows:

$$\eta = 90 - \delta - N \times \theta \div 2 (°)$$

Then, a horizontal distance D of a floor portion from the installment position of the air conditioner 100 or the infrared sensor 1 is given as follows. From this floor portion, an nth light-receiving element from the top among the vertically arranged light-receiving elements can detect.

$$D = h \times \tan(\eta + n \times \theta)(m)$$

To take an example, the distance D from the air conditioner from which the third light-receiving element 2f from the top among the vertically arranged light-receiving elements can detect, using the light-distribution view angle, is 3.26 m. This value fits in the range listed in the table of FIG. 17.

The nth light-receiving element from the top among the vertically arranged light-receiving elements for detecting a location in the vicinity of a foot of a human body sitting in the arbitrary distance D from the air conditioner 100 is given as follows, based on the above description:

$$n = (\tan^{-1}(D \div h) - \eta) \div \theta$$

Then, the value of n obtained by this computation is rounded off to the nearest whole number. Then, the resulting value indicates the nth light-receiving element from the top among the vertically arranged light-receiving elements which can detect the location in the vicinity of the foot of the sitting human body.

Next, assume that the height of the sitting human body is set to L. Then, an mth light-receiving element from the top among the vertically arranged light-receiving elements for detecting a location in the vicinity of a head portion of the human body sitting in the arbitrary distance D from the air conditioner 100 is given as follows:

$$m = (\tan^{-1}(D \div (h-L)) - \eta) \div \theta$$

Then, the value of m obtained by this computation is rounded off to the nearest whole number. The resulting value indicates the mth light-receiving element from the top among the vertically arranged light-receiving elements which can detect the location in the vicinity of the head portion of the sitting human body.

More specifically, in order to detect the sitting human body in the arbitrary distance D from the air conditioner 100, the nth to mth light-receiving elements from the top among the vertically arranged light-receiving elements are needed.

In other words, the (N−m)th to (N−n)th light-receiving elements from the bottom among the vertically arranged light-receiving elements are needed. The light-receiving elements in the following range of the ratio to the whole length of the multi-element light-receiving unit 2 are needed:

$$(N-m) \div N \text{ to } (N-n) \div N$$

According to this embodiment, the need for newly developing light-receiving elements of the infrared sensor 1 is eliminated so as to improve detection accuracy of a subject located far from the air conditioner 100. Sensitivity of the far subject may be improved using the existing elements.

Further, it is not necessary to employ a silicon filter which has a characteristic of a high infrared ray transmittance and is extremely expensive so as to improve detection accuracy or the sensor SN (signal/noise) ratio of a subject positioned in a far location. A filter made of polyethylene, which is cheap and versatile, may be adopted. With this arrangement, a great cost reduction effect may be expected.

Further, an improvement in the SN (signal/noise) ratio of the element for detecting a subject positioned in a far location means that a margin is provided for a software threshold in a human body detection software algorithm, and that an amplification factor may also be increased. In the human body detection software algorithm, operation is performed using a difference between thermal images generated by scanning of a sensor.

The human body soft algorithm is disclosed in Japanese Published Patent Application No. 2010-91253

Second Embodiment

Figure 21:
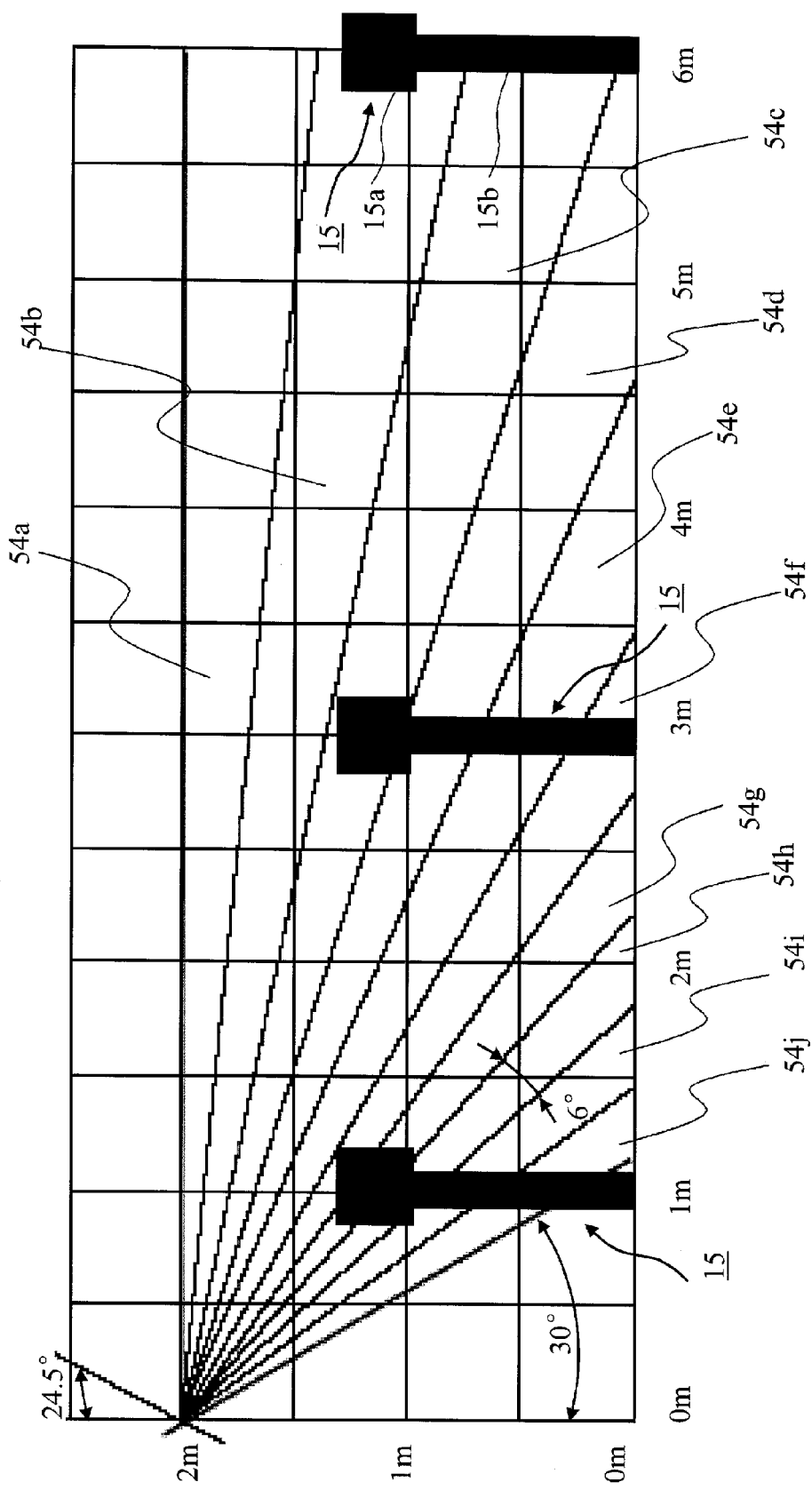
FIG. 21 shows vertical light-distribution view angles of an infrared sensor 1 in a longitudinal section plane of the infrared sensor 1 in a second embodiment when the infrared sensor 1 is formed of 10 light-receiving elements.

FIG. 21 is a diagram showing vertical light-distribution view angles in a longitudinal section plane of an infrared sensor 1 when the infrared sensor 1 is formed of 10 light-receiving elements.

FIG. 21 shows the light-distribution view angles in the longitudinal section plane of the infrared sensor 1 formed of the 10 light-receiving elements when the depression angle of the infrared sensor 1 is set to 24.5° and the vertical light-distribution view angle per light-receiving element is set to 6°.

In this case, detection sensitivity using each of light-distribution view angles 54b to 54c should be improved so as to improve detection sensitivity of a human body sitting in a distance of 6 m from the infrared sensor 1.

Figure 22:
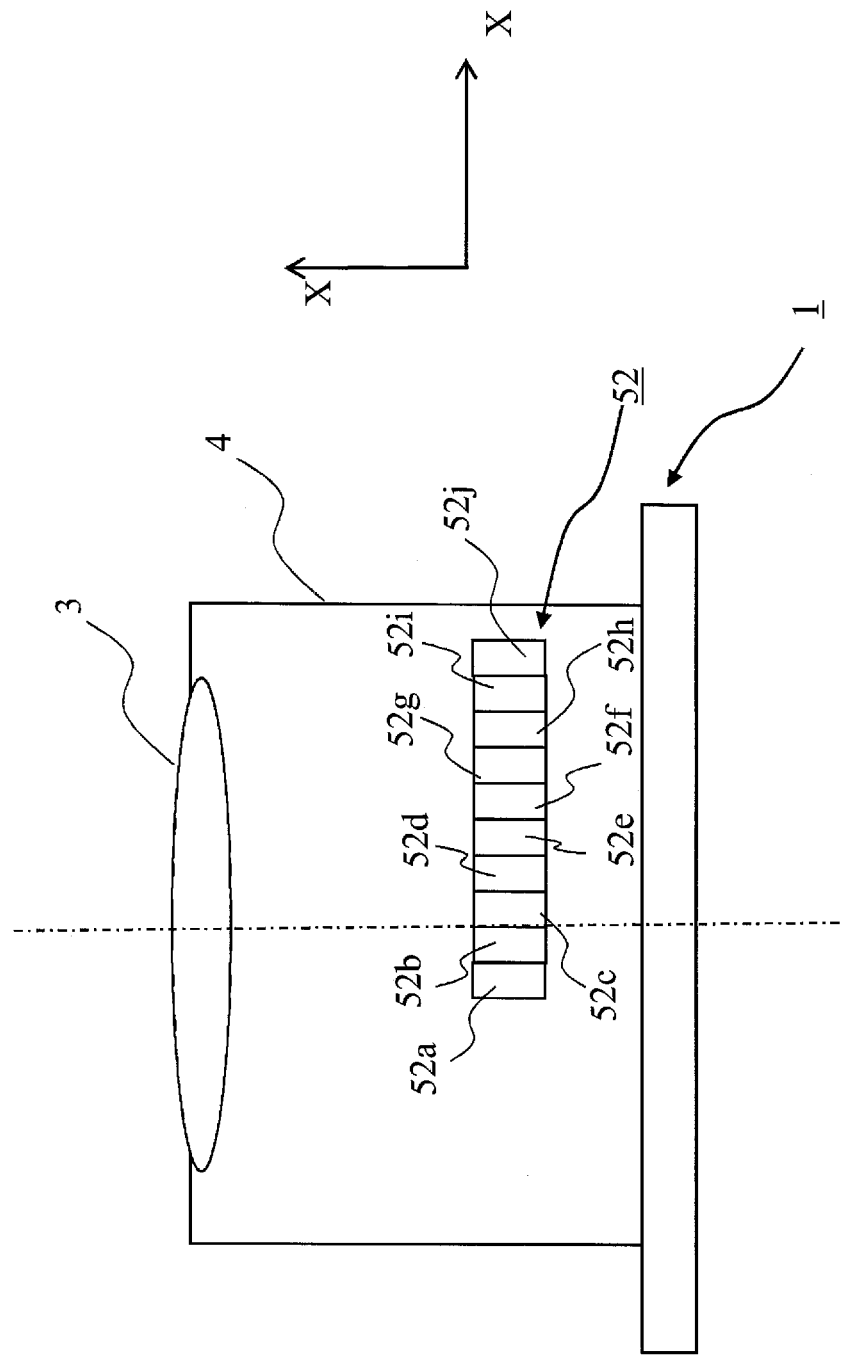
FIG. 22 is a sectional view showing a structure of the infrared sensor 1 in the second embodiment.
Figure 23:
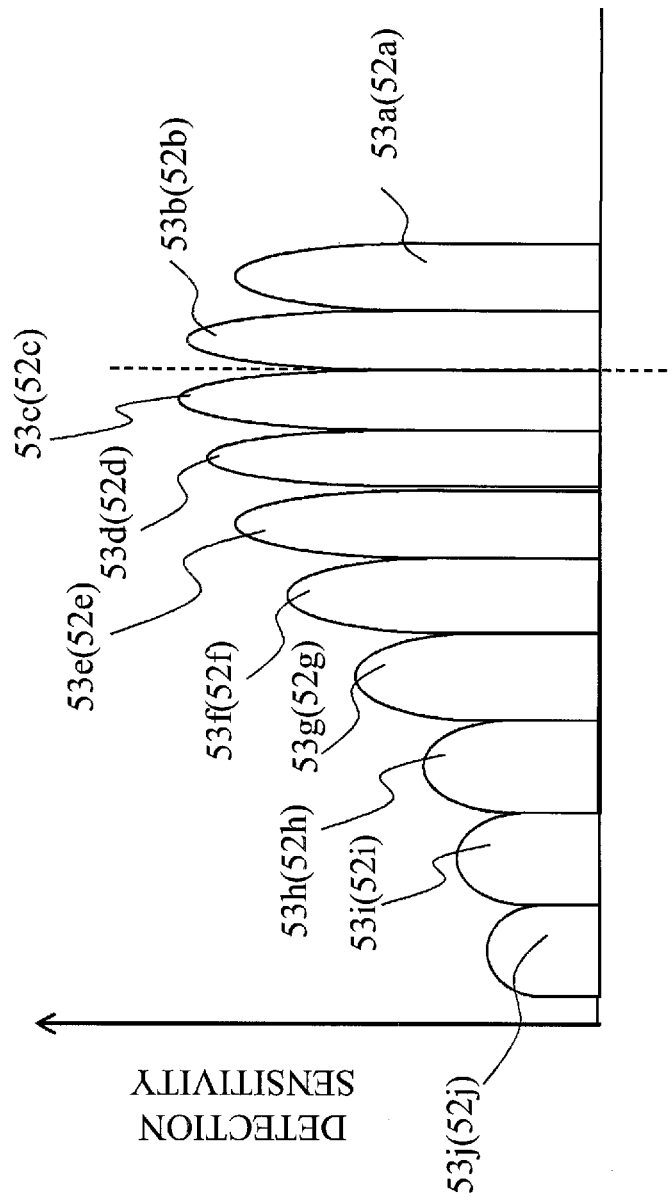
FIG. 23 is a graph showing infrared ray detection sensitivity distributions of the infrared sensor 1 in the second embodiment.
Figure 24:
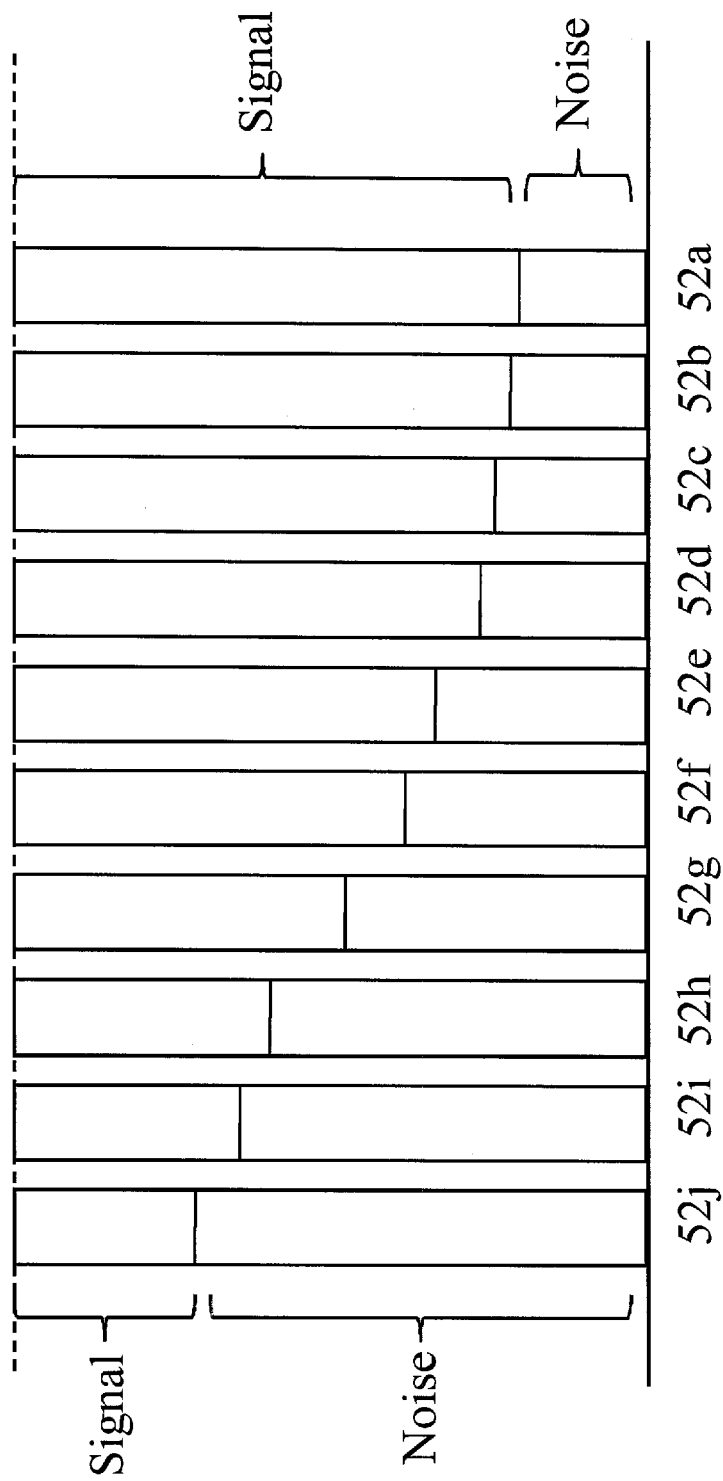
FIG. 24 is a graph showing SN (signal/noise) ratio characteristics of the infrared sensor 1 in the second embodiment.

FIG. 22 is a sectional view showing a structure of the infrared sensor 1. FIG. 23 is a diagram showing infrared ray detection sensitivity distributions of the infrared sensor 1. FIG. 24 is a graph showing SN (signal/noise) ratio characteristics of the infrared sensor 1.

The center of a condenser lens 3 is disposed at a position of approximately one-fifth of the whole length of a multi-element light-receiving unit 52 in which light-receiving elements 52a to 52j are aligned, as shown in FIG. 22. This disposition is performed in order to improve detection sensitivity using each of the light-distribution view angles 54b and 54c.

With this disposition, an incident infrared ray sensitivity characteristic of each of the light-receiving elements 52a to 52j shown in FIG. 23 is obtained.

Likewise, an SN (signal/noise) ratio characteristic of each of the light-receiving elements 52a to 52j shown in FIG. 24 is obtained.

Figure 25:
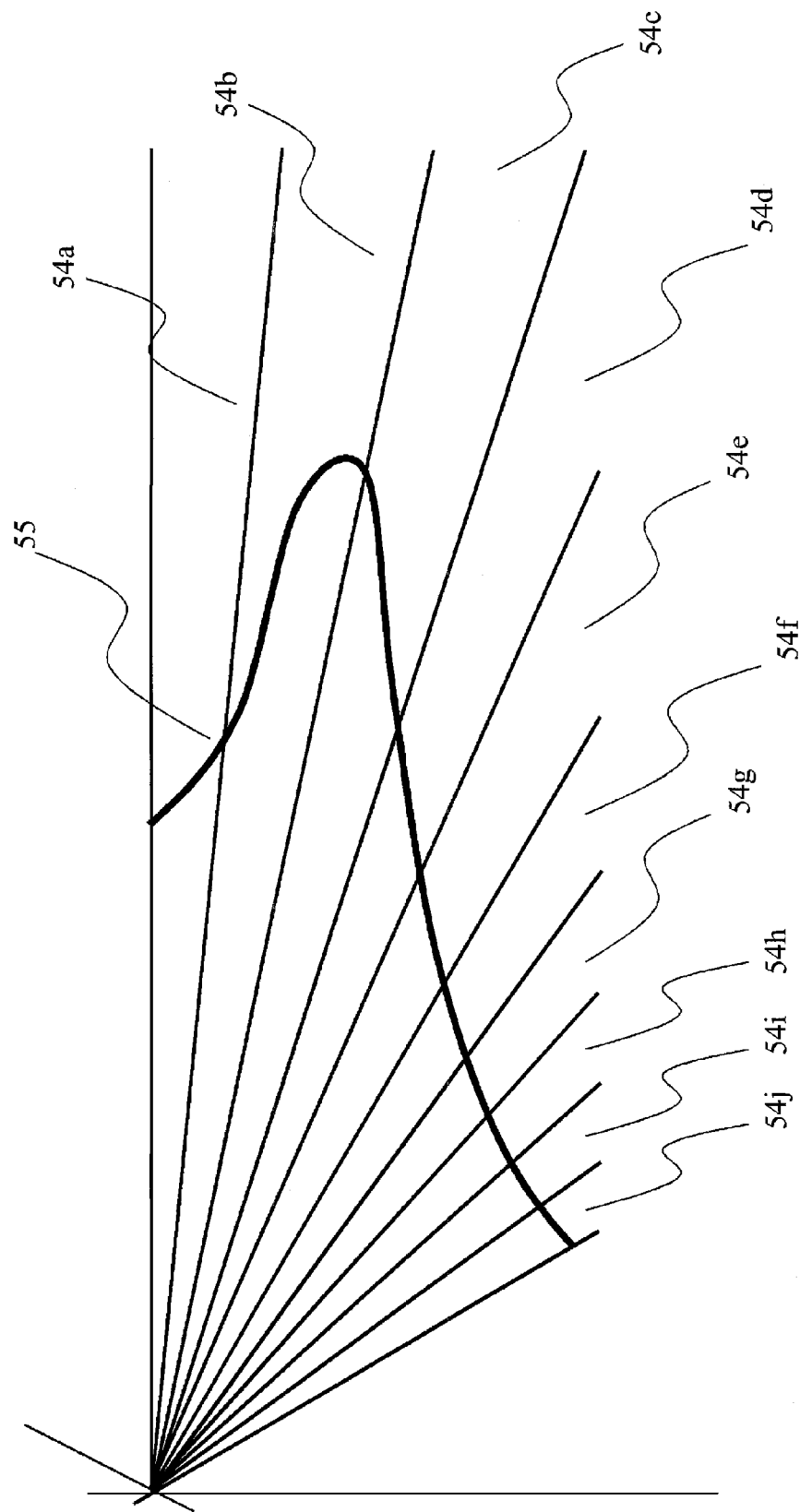
FIG. 25 is a graph showing a light-distribution sensitivity characteristic of the infrared sensor 1 in the second embodiment.

FIG. 25 is a diagram showing a light-distribution sensitivity characteristic of the infrared sensor 1. Referring to FIG. 25, light reception sensitivity 55 of the multi-element light-receiving unit 52 or light reception sensitivity 55 of each of the light-receiving elements 52a to 52j is added to light-distribution view angles 54a and 54d to 54j, and the light distribution view angles 54b and 54c.

Third Embodiment

Figure 26:
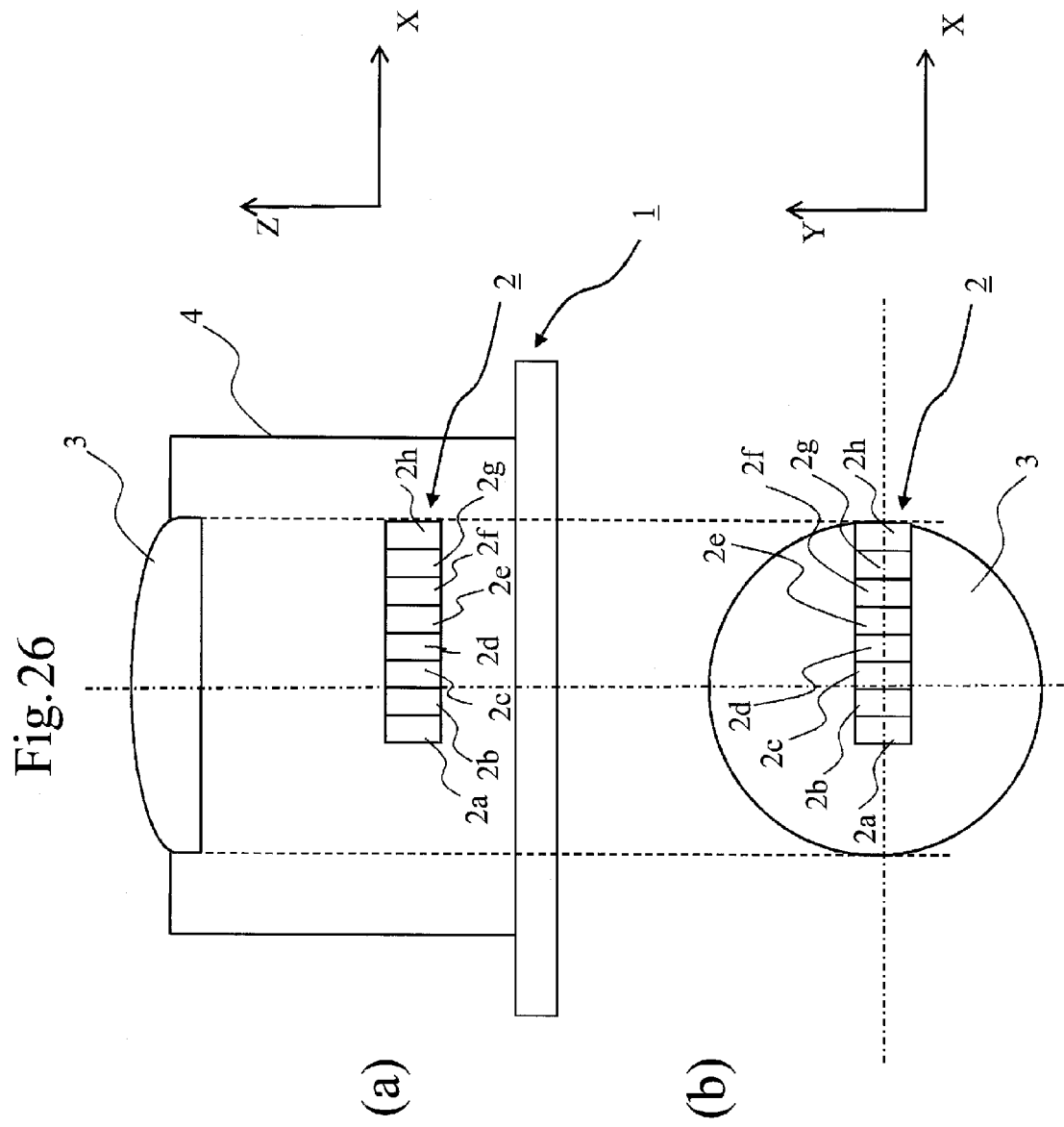
FIG. 26 includes sectional views each showing a structure of an infrared sensor 1 in a third embodiment when a plano-convex lens is employed for a condenser lens 3.

FIG. 26 is a sectional view showing a structure of an infrared sensor 1 when a plano-convex lens, for example, is employed for a condenser lens 3. The condenser lens 3 may be the plano-convex lens as shown in FIG. 26, or a lens of the other shape.

Fourth Embodiment

Figure 27:
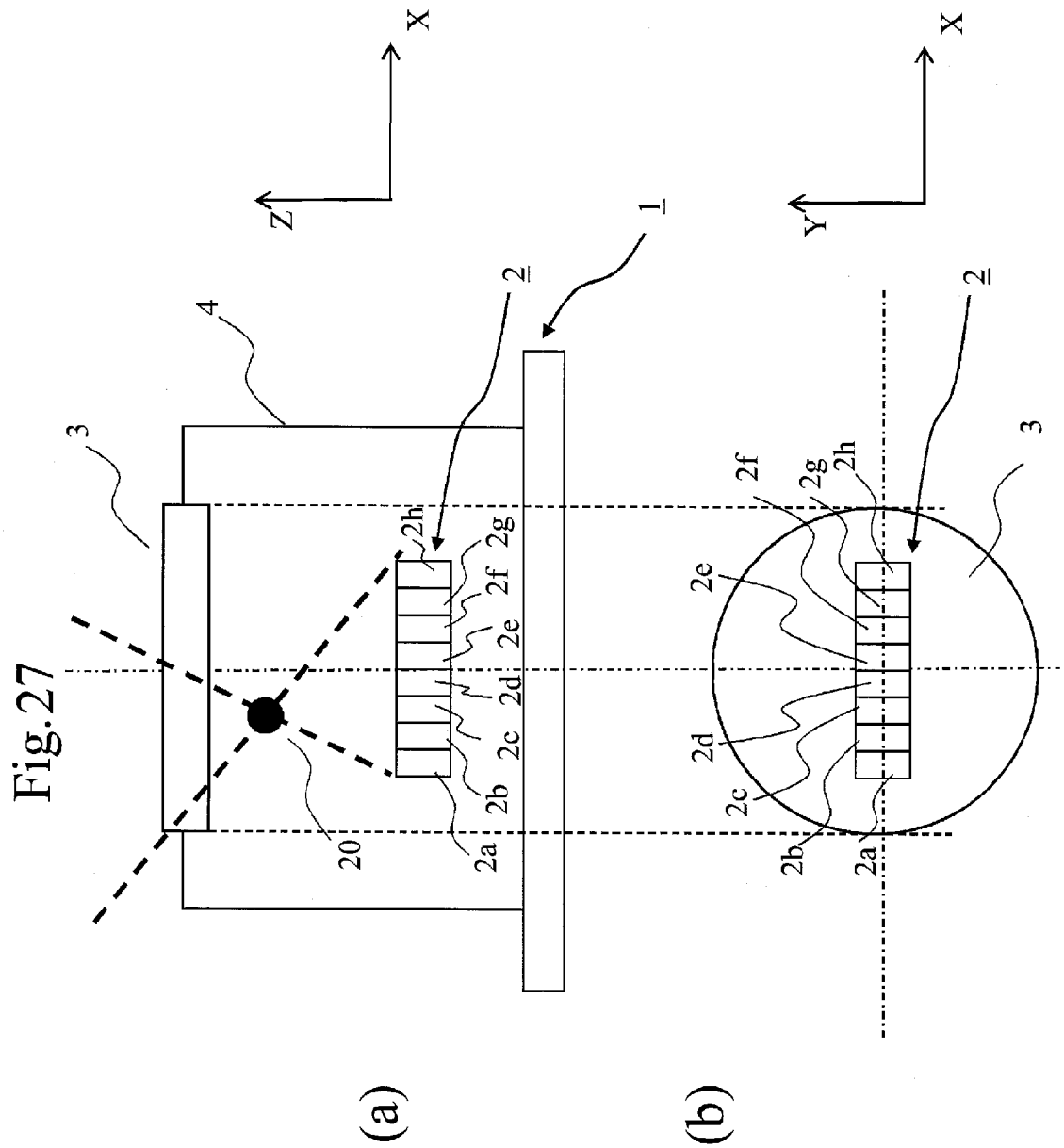
FIG. 27 includes sectional views each showing a structure of an infrared sensor 1 in a fourth embodiment when a focal point 20 of a condenser lens 3 is eccentric.

FIG. 27 is a sectional view showing a structure of an infrared sensor 1 when a focal point 20 of a condenser lens 3 is eccentric.

The focal point of the condenser lens 3 may be eccentric from the center of the condenser lens 3, as shown in FIG. 27.

When the focal point of the condenser lens 3 is positioned at a desired location, an intersection between a multi-element light-receiving unit 2 and a perpendicular line from the center of the condenser lens 3 to the multi-element light-receiving unit 2 may be made to coincide with the center of the multi-element light-receiving unit 2.

Fifth Embodiment

Figure 28:
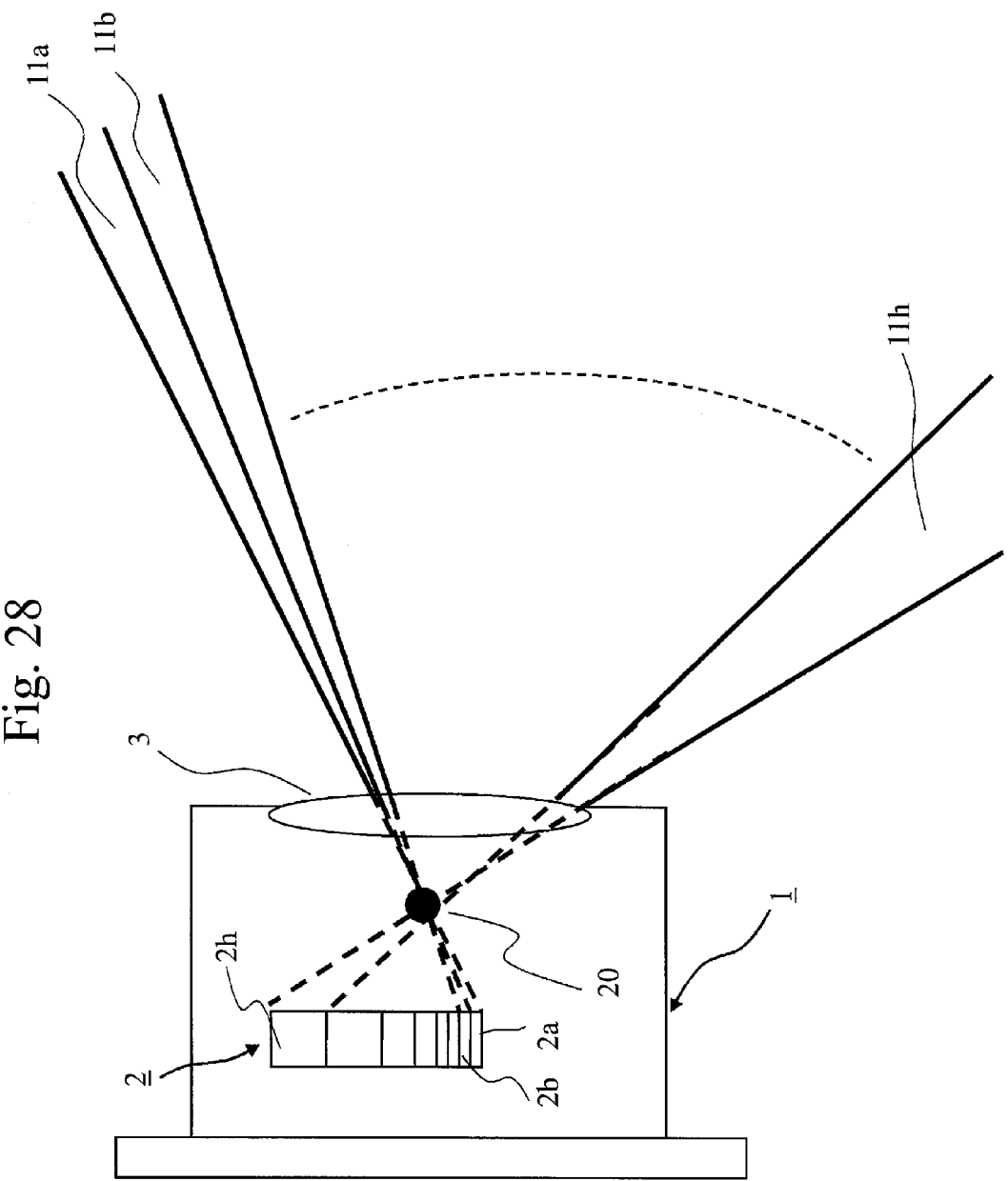
FIG. 28 is a diagram showing positional relationships between respective light-receiving elements 2*a* to 2*h* of an infrared sensor 1 in a fifth embodiment and respective vertical light-distribution view angles 11*a* to 11*h* when the vertical light-distribution angles of the light-receiving elements for detecting a far location are narrowed and the vertical light-distribution view angle of the light-receiving element for detecting a nearby location is widened.

FIG. 28 is a diagram showing positional relationships between respective light-receiving elements 2a to 2h of an infrared sensor 1 and respective vertical light-distribution view angles 11a to 11h when the vertical light-distribution view angles of the light-receiving elements for detecting a far location are narrowed and the vertical light-distribution view angle of the light-receiving element for detecting a nearby location is widened.

Figure 29:
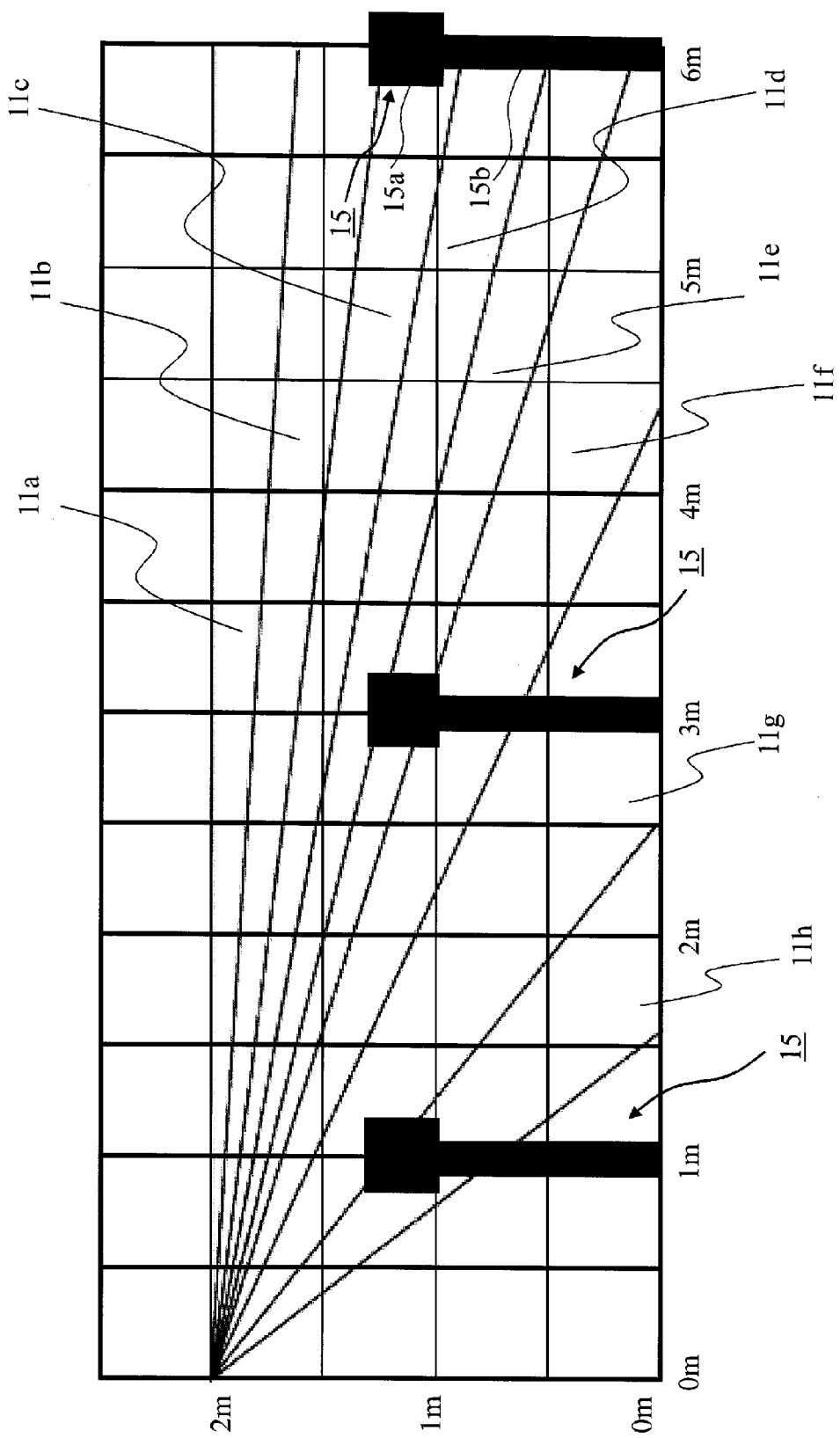
FIG. 29 is a diagram showing sitting human body models 15 and vertical light-distribution view angles of the infrared sensor 1 in a longitudinal section plane of the infrared sensor 1 in the fifth embodiment when the light-distribution view angles of the light-receiving elements for detecting a far location are narrowed and the light-distribution view angles of the light-receiving elements for detecting a nearby location are widened.

FIG. 29 shows the vertical light-distribution view angles of the infrared sensor 1 in a longitudinal section plane of the infrared sensor 1 when the light-distribution view angles of the light-receiving elements for detecting a far location are narrowed and the light-distribution view angles of the light-receiving elements for detecting a nearby location are widened. Sitting human body models 15 are disposed in the FIG. 29.

The light-distribution view angles of the light-receiving elements in a lower portion of the vertically aligned light-receiving elements are narrowed, and the light-distribution view angle of the light-receiving element is widened more toward an upper portion of the longitudinally aligned light-receiving elements, as shown in FIG. 28. That is, the light-distribution view angle of the light-receiving element for detecting a far location is narrowed and the light-distribution view angle of the light-receiving element for detecting a nearby location is widened.

Referring to FIG. 28, the vertical light-distribution view angle 11a of the light-receiving element 2a for detecting a most distant location from the infrared sensor 1 is the narrowest. Then, the vertical light-distribution view angle is widened more toward the light-receiving element for detecting a nearby location. The light-distribution view angle of the light-receiving element 2h for detecting a nearest location from the infrared sensor 1 is the widest.

With this configuration, the number of the light-receiving elements for detecting a location far from the installment position of an air conditioner may be increased. Detection sensitivity of the far location may be further improved.

To take an example, when detecting a sitting subject in a distance of 1 m from the installment position of the air conditioner as shown in FIG. 29, detection is performed using the light-distribution view angles 11h and 11g. On the other hand, when detecting a sitting subject in a far distance of 6 m from the installment position of the air conditioner, detection is performed using the light-distribution view angles 11b, 11c, 11d, 11e, and 11f. The number of the light-receiving elements for detecting a far location is therefore increased, and detection sensitivity of the far location is further improved.

REFERENCE SIGNS LIST 1 infrared sensor, 2 multi-element light-receiving unit, 2a to 2h light-receiving elements, 3 condenser lens, 4 metallic can, 5 housing, 6 stepping motor, 7 base, 8 substrate, 9 sensor output microcomputer, 10 connector, 11 light-distribution view angles, 12 housewife, 13 infant, 15 sitting human models, 20 focal point, 21a to 21h detection sensitivity, 22 perpendicular line, 40 indoor unit housing, 41 air inlet port, 42 air outlet port, 43 upper and lower louvers, 44 right and left louvers, 45 blower, 46 heat exchanger, 46a front-surface upper heat exchanger, 46b front-surface lower heat exchanger, 46c rear-surface heat exchanger, 52 multi-element light-receiving unit, 54 light-distribution view angles, 55 light reception sensitivity, 100 air conditioner

The invention claimed is:

1. An air conditioner including an infrared sensor, the infrared sensor comprising:
   a multi-element light-receiving unit formed of a plurality of light-receiving elements aligned on a straight line; and
   a condenser lens;
   wherein the multi-element light-receiving unit is disposed at a position of receiving infrared rays which have passed through the condenser lens; and
   a position of receiving an intensity distribution peak of the infrared rays which have passed through the condenser lens is deviated from the center of the multi-element light-receiving unit;

wherein the air conditioner is installed indoors;
wherein the plurality of light-receiving elements forming the multi-element light-receiving unit are arranged in a vertical direction with respect to an indoor floor surface; and
wherein an intersection between the multi-element light-receiving unit and a perpendicular line from a focal point of the condenser lens to the multi-element light-receiving unit is located at a position of approximately a lower one-fifth of the whole length of the multi-element light-receiving unit.

2. An air conditioner including an infrared sensor, the infrared sensor comprising:
   a multi-element light-receiving unit formed of a plurality of light-receiving elements aligned on a straight line; and
   a condenser lens;
   wherein the multi-element light-receiving unit is disposed at a position of receiving infrared rays which have passed through the condenser lens; and
   a position of receiving an intensity distribution peak of the infrared rays which have passed through the condenser lens is deviated from the center of the multi-element light-receiving unit;
wherein the air conditioner is installed indoors;
wherein the plurality of light-receiving elements forming the multi-element light-receiving unit are arranged in a vertical direction with respect to an indoor floor surface; and
wherein when a depression angle of the infrared sensor is set to $\delta$, a light-distribution view angle of each light-receiving element is set to $\theta$, an installation height of the infrared sensor is set to h, the number of the light-receiving elements forming the multi-element light-receiving unit is set to N, a height of a target of which heat detection is performed by the infrared sensor is set to L, and a horizontal distance between the target of which heat detection is performed by the infrared sensor and the infrared sensor is set to D, an intersection between the multi-element light-receiving unit and a perpendicular line from a focal point of the condenser lens to the multi-element light-receiving unit is located at a position in a range of $(N-m) \div N$ to $(N-n) \div N$ of the whole length of the multi-element light-receiving unit from a bottom of the multi-element light-receiving unit, in which n is an integer obtained by rounding off a value of computation of $n=(\tan^{-1}(D \div h)-(90-\delta-N \times \theta \div 2)) \div \theta$ to a nearest whole number;
m is an integer obtained by rounding off a value of computation of $m=(\tan^{-1}(D \div (h-L))-(90-\delta-N \times \theta \div 2)) \div \theta$ to a nearest whole number; and
the depression angle of the infrared sensor is an installation angle of the infrared sensor with respect to a horizontal line, and the light-distribution view angle of each light-receiving element is an angle in the vertical direction at which each light-receiving element may detect infrared ray.

* * * * *